(12) United States Patent
Discekici et al.

(10) Patent No.: US 12,447,675 B2
(45) Date of Patent: Oct. 21, 2025

(54) THREE-DIMENSIONAL PRINTING

(71) Applicant: PERIDOT PRINT LLC, Palo Alto, CA (US)

(72) Inventors: Emre Hiro Discekici, San Diego, CA (US); Graciela E. Negri Jimenez, San Diego, CA (US); Shannon Reuben Woodruff, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 0 days.

(21) Appl. No.: 18/662,874

(22) Filed: May 13, 2024

(65) Prior Publication Data
US 2024/0293967 A1 Sep. 5, 2024

Related U.S. Application Data

(63) Continuation of application No. 17/298,643, filed as application No. PCT/US2019/051720 on Sep. 18, (Continued)

(51) Int. Cl.
*B29C 64/165* (2017.01)
*B29C 64/188* (2017.01)
(Continued)

(52) U.S. Cl.
CPC .......... *B29C 64/165* (2017.08); *B29C 64/188* (2017.08); *B33Y 10/00* (2014.12);
(Continued)

(58) Field of Classification Search
CPC .......... B29C 64/165; B29K 2105/0032; B29K 2995/002; B29K 2995/0092; B33Y 10/00; B33Y 70/00
(Continued)

(56) References Cited

U.S. PATENT DOCUMENTS 7,087,109 B2   8/2006 Bredt et al.
10,293,555 B2  5/2019 Kojima et al.
(Continued)

FOREIGN PATENT DOCUMENTS

CN   101585549 A   11/2009
CN   106925773 A   7/2017
(Continued)

OTHER PUBLICATIONS

Lubrizol, Product Data Sheet for Carbosperse K-7028, Apr. 27, 2021, 2 pages.

*Primary Examiner* — Leo B Tentoni
(74) *Attorney, Agent, or Firm* — Dierker & Kavanaugh, P.C.

(57) ABSTRACT

In an example of a method for three-dimensional (3D) printing, a polymeric build material is applied to form a build material layer. A fusing agent is selectively applied, based on a 3D object model, onto the build material layer to form a patterned portion. A hydrophilic agent is selectively applied, based on the 3D object model, onto at least a portion of the patterned portion. The hydrophilic agent includes from 1 wt % to 12 wt % of a hydrophilic polymer dissolved in an aqueous liquid vehicle, wherein the hydrophilic polymer has a molar mass ranging from 1000 g/mol to 12,000 g/mol and is water-absorbent at a water to hydrophilic polymer weight ratio from 2:1 to 1000:1. The build material layer is exposed to energy to selectively coalesce the patterned portion and form a 3D object layer having a hydrophilic portion.

18 Claims, 8 Drawing Sheets

Related U.S. Application Data 2019, now Pat. No. 12,023,861, which is a continuation-in-part of application No. PCT/US2019/045313, filed on Aug. 6, 2019.

(51) Int. Cl.
*B33Y 10/00* (2015.01)
*B33Y 70/00* (2020.01)
*B29K 105/00* (2006.01)

(52) U.S. Cl.
CPC ...... *B33Y 70/00* (2014.12); *B29K 2105/0032* (2013.01); *B29K 2995/002* (2013.01); *B29K 2995/0092* (2013.01)

(58) Field of Classification Search
USPC .................................................. 264/78, 494
See application file for complete search history.

(56) References Cited

U.S. PATENT DOCUMENTS

| | | |
|---|---|---|
| 11,485,870 B2 | 11/2022 | Prasad et al. |
| 2005/0046067 A1 | 3/2005 | Oriakhi et al. |
| 2005/0059757 A1 | 3/2005 | Bredt et al. |
| 2005/0080191 A1 | 4/2005 | Kramer et al. |
| 2006/0192315 A1 | 8/2006 | Farr et al. |
| 2006/0208388 A1 | 9/2006 | Bredt et al. |
| 2006/0230984 A1 | 10/2006 | Bredt et al. |
| 2007/0241482 A1* | 10/2007 | Giller .................... B29C 64/165 |
| | | 264/494 |
| 2012/0289607 A1 | 11/2012 | Xiong et al. |
| 2017/0247558 A1 | 8/2017 | Chen et al. |
| 2018/0104894 A1 | 4/2018 | Fung et al. |
| 2018/0126631 A1 | 5/2018 | Nauka et al. |
| 2018/0194959 A1 | 7/2018 | Kasperchik et al. |
| 2018/0272607 A1 | 9/2018 | Chaffins et al. |
| 2018/0290925 A1 | 10/2018 | Poulesquen et al. |
| 2018/0311892 A1 | 11/2018 | Abbott et al. |
| 2018/0333914 A1 | 11/2018 | Rudisill et al. |
| 2019/0030797 A1 | 1/2019 | Ge et al. |
| 2019/0047216 A1 | 2/2019 | Emamjomeh et al. |

FOREIGN PATENT DOCUMENTS

| | | |
|---|---|---|
| CN | 108084342 A | 5/2018 |
| CN | 108250704 A | 7/2018 |
| EP | 2269808 B1 | 3/2017 |
| WO | 2017/146741 A1 | 8/2017 |
| WO | 2017/213666 A1 | 12/2017 |
| WO | 2018/095837 A1 | 5/2018 |
| WO | 2019/108288 A1 | 6/2019 |

* cited by examiner

THREE-DIMENSIONAL PRINTING

CROSS-REFERENCE TO RELATED APPLICATIONS

This application is a continuation of U.S. application Ser. No. 17/298,643, filed May 31, 2021 (now U.S. Pat. No. 12,023,861), which itself is a 371 National Stage Entry of International Application No. PCT/US2019/051720, filed Sep. 18, 2019, which itself is a continuation-in-part of PCT/US2019/045313, filed on Aug. 6, 2019, the contents of each of which are incorporated herein by reference in their entirety.

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing liquid(s), or combinations thereof). This is unlike traditional machining processes, which often rely upon the removal of material to create the final part. Some 3D printing methods use chemical binders or adhesives to bind build materials together. Other 3D printing methods involve at least partial coalescence of the build material, and the mechanism for material coalescence (e.g., curing, thermal merging/fusing, melting, sintering, etc.) may depend upon the type of build material used. For some materials, at least partial coalescence may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
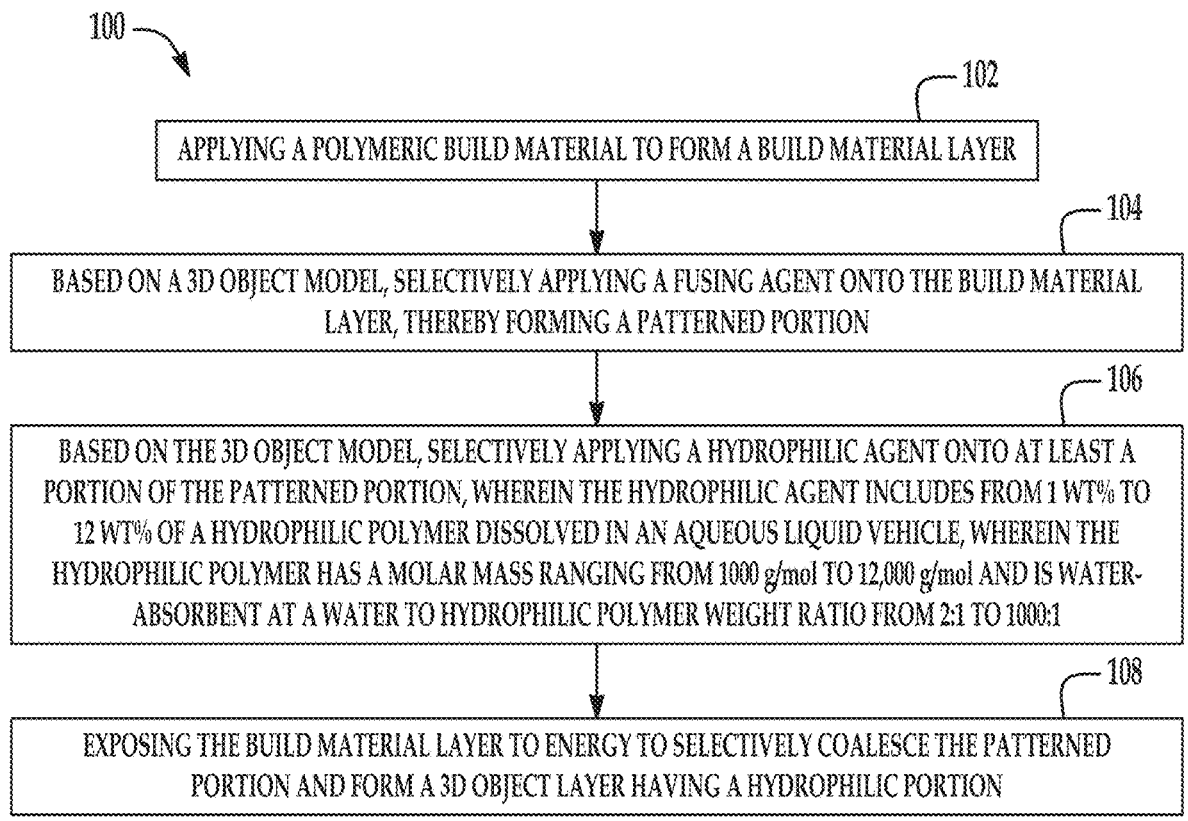
FIG. 1 is a flow diagram depicting an example of a 3D printing method.

The surface properties of three-dimensionally printed objects are generally dictated by the properties of the bulk build material that is used. For example, 3D printed objects generated with polyamide-6,6 are more hydrophilic than 3D printed objects generated with, e.g., polypropylene or polyamide-12. In the examples disclosed herein, a hydrophilic agent may be used to generate 3D printed parts with tailored surface hydrophilicity, which may be vastly different from the intrinsic property of the bulk build material that is used. This is due to the fact that the hydrophilic agent is selectively jetted on the build material during the printing process. The ability to jet the hydrophilic agent via any suitable inkjet printing technique enables controlled (and potentially varying) hydrophilicity to be spatially incorporated into the periphery of 3D printed objects at the voxel level.

Moreover, the hydrophilic agent imparts hydrophilicity to the particular area(s) of the build material as the individual layer(s) of the 3D object/part is/are being formed. As such, post-processing techniques for surface modification are not performed. This can speed up the printing process as well as render it more cost effective.

Still further, the hydrophilic agent disclosed herein alters the wetting property of the bulk build material without significant chemical modification to the bulk build material.

Throughout this disclosure, a weight percentage that is referred to as "wt % active" refers to the loading of an active component of a dispersion or other formulation that is present, e.g., in the hydrophilic agent, fusing agent, detailing agent, etc. For example, an energy absorber, such as carbon black, may be present in a water-based formulation (e.g., a stock solution or dispersion) before being incorporated into the fusing agent vehicle. In this example, the wt % actives of the carbon black accounts for the loading (as a weight percent) of the carbon black solids that are present in the fusing agent, and does not account for the weight of the other components (e.g., water, etc.) that are present in the stock solution or dispersion with the carbon black. The term "wt %," without the term actives, refers to either i) the loading (in the hydrophilic agent, fusing agent, etc.) of a 100% active component that does not include other non-active components therein, or ii) the loading (in the hydrophilic agent, fusing agent, etc.) of a material or component that is used "as is" and thus the wt % accounts for both active and non-active components.

3D Printing Fluid Kits, 3D Printing Kits, and 3D Printing Compositions

The examples disclosed herein include fluid kits for three-dimensional (3D) printing, three-dimensional (3D) printing kits, and three-dimensional (3D) printing compositions.

An example of a multi-fluid kit includes a hydrophilic agent including from 1 wt % to 12 wt % of a hydrophilic polymer dissolved in an aqueous liquid vehicle, wherein the hydrophilic polymer has a molar mass ranging from 1000 g/mol to 12,000 g/mol and is water-absorbent at a water to hydrophilic polymer weight ratio from 2:1 to 1000:1; a core fusing agent including an energy absorber having absorption at wavelengths ranging from 400 nm to 4000 nm; and a primer fusing agent including a plasmonic resonance absorber having absorption at wavelengths ranging from 800 nm to 4000 nm and having transparency at wavelengths ranging from 400 nm to 780 nm. Some examples of the multi-fluid kit further include a detailing agent. Other examples of the multi-fluid kit further include a coloring agent. Still other examples of the multi-fluid include further include both a detailing agent and a coloring agent.

Any example of the multi-fluid kit may also be part of a 3D printing kit and/or composition. In addition to the fluids of the multi-fluid kit, the 3D printing kit also includes a build material composition.

It is to be understood that the components of the fluid kits and/or of the 3D printing kits may be maintained separately until used together in examples of the 3D printing method disclosed herein.

As used herein, it is to be understood that the terms "material set" or "kit" may, in some instances, be synonymous with "composition." Further, "material set" and "kit" are understood to be compositions comprising one or more components where the different components in the compositions are each contained in one or more containers, separately or in any combination, prior to and during printing but these components can be combined together during printing. The containers can be any type of a vessel, box, or receptacle made of any material.

As mentioned above, various agents may be included in the fluid kits and/or 3D printing kits disclosed herein. Example compositions of the hydrophilic agent, the fusing agents, the detailing agent, the coloring, and the build material composition will now be described.

Hydrophilic Agent

The multi-fluid kit(s) and the 3D printing kit(s) disclosed herein include the hydrophilic agent. The hydrophilic agent includes a hydrophilic polymer dissolved in an aqueous liquid vehicle.

Hydrophilic Polymer

The hydrophilic polymer used in the hydrophilic agent is water-absorbent. By "water-absorbent," it is meant the hydrophilic polymer can absorb and retain large amounts of water relative to its own mass, e.g., at a water to hydrophilic polymer weight ratio ranging from 2:1 to 1000:1. Suitable hydrophilic polymers include poly(acrylamide):

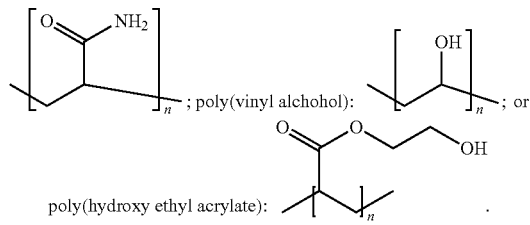

In any of these examples, n can be an integer, along with any capping groups that may be present, that provides the polymer with a molar mass ranging from about 1,000 g/mol to about 12,000 g/mol. As examples, n may range from about 10 to about 60, from about 12 to about 52, or from about 16 to about 40. "n" may also be selected so that the molar mass of the hydrophilic polymer ranges from about 1,000 g/mol to about 8,000 g/mol, or from about 1,200 g/mol to about 5,000 g/mol.

In some examples, the hydrophilic polymer may be a polyelectrolyte. In some examples, the polyelectrolyte may be a strong polyelectrolyte that is fully dissociated and fully charged in the aqueous liquid vehicle. In other examples, the polyelectrolyte may be a weak polyelectrolyte having a dissociation constant (pKa or pKb) ranging from about 2 to about 10, meaning that it partially dissociates in the aqueous liquid vehicle (at neutral pH), and thus is partially charged. The dissociated polyelectrolyte can be anionic. As such, in one example, the polyelectrolyte is an anionic polyelectrolyte.

One specific example of the anionic polyelectrolyte (shown in its protonated form, but capable of becoming negatively charged) includes a linear hydrophilic polymer, such as poly(acrylic acid):

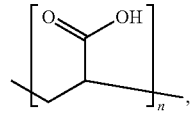

or copolymers thereof. In this example, n can be an integer, along with any capping groups that may be present, that provides the polymer with a molar mass ranging from about 1,000 g/mol to about 12,000 g/mol. As examples, n may range from about 10 to about 60, from about 12 to about 52, or from about 16 to about 40. "n" may also be selected so that the molar mass of the polyelectrolyte ranges from about 1,000 g/mol to about 8,000 g/mol, or from about 1,200 g/mol to about 5,000 g/mol.

The anionic polyelectrolyte may include cationic counter ions, such as sodium cations ($Na^+$), potassium cations ($K^+$), etc. As examples, the polyelectrolyte may be selected from the group consisting of poly(acrylic acid sodium salt), poly(acrylic acid) partial potassium salt), and poly(acrylamide-co-acrylic acid) partial sodium salt.

In one example, the hydrophilic polymer is selected from the group consisting of poly(acrylic acid) sodium salt, poly(vinyl alcohol), poly(acrylamide), and poly(hydroxy ethyl acrylate).

The hydrophilic polymer may be present in the hydrophilic agent in an amount ranging from about 1 wt % to about 12 wt % based on a total weight of the hydrophilic agent. Higher amounts may deleteriously affect the jetting reliability of the hydrophilic agent. In other examples, the hydrophilic polymer may be present in the hydrophilic agent in an amount ranging from about 2 wt % to about 10 wt %, or from about 4 wt % to about 8 wt %.

Aqueous Liquid Vehicle

The hydrophilic agent also includes an aqueous liquid vehicle. The aqueous liquid vehicle may include water alone, or in combination with a water miscible organic co-solvent. In some examples, the aqueous liquid vehicle may include other components, depending, in part, upon the applicator that is to be used to dispense the hydrophilic agent. Examples of other suitable hydrophilic agent components include surfactant(s), antimicrobial agent(s), anti-kogation agent(s), chelating agent(s), and/or buffer(s).

Classes of organic co-solvents that may be used in the hydrophilic agent include aliphatic alcohols, aromatic alcohols, diols, glycol ethers, polyglycol ethers, lactams, formamides (substituted and unsubstituted), acetamides (substituted and unsubstituted), glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,5-pentanediol, 2-methyl-1,3-propanediol, etc.), ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, 2-pyrrolidone, 1-methyl-2-pyrrolidone, 1-(2-hydroxyethyl)-2-pyrrolidone, and the like. Other examples of organic co-solvents include dimethyl sulfoxide (DMSO), isopropyl alcohol, ethanol, pentanol, acetone, or the like.

The co-solvent(s) may be present in the hydrophilic agent in a total amount ranging from about 1 wt % to about 50 wt % based upon the total weight of the hydrophilic agent. In an example, the hydrophilic agent include from about 1 wt % to about 10 wt %, or from about 1 wt % to about 5 wt % of the co-solvent(s).

It is to be understood that the amount of water and co-solvent(s) in the hydrophilic agent may also depend, in part, upon the jetting technology that is to be used to dispense the hydrophilic agent. For example, if thermal inkjet printheads are to be used, water may be make up 35 wt % or more of the hydrophilic agent, and may be present in a higher amount than the co-solvent(s). For another example, if piezoelectric inkjet printheads are to be used, water may make up from about 25 wt % to about 30 wt % of the hydrophilic agent, and the co-solvent may be present in an amount of 35 wt % or more.

Suitable surfactant(s) for the hydrophilic agent include non-ionic, anionic, or cationic surfactants. Some example surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, fluorosurfactants, and the like. Some specific examples include a self-emulsifiable, non-ionic wetting agent based on acetylenic diol chemistry (e.g., SURFYNOL® SEF from Evonik Degussa), a non-ionic fluorosurfactant (e.g., CAPSTONE® fluorosurfactants, such as CAPSTONE® FS-35, from Chemours), an ethoxylated low-foam wetting agent (e.g., SURFYNOL® 440 or SURFYNOL® CT-111 from Evonik Degussa), an ethoxylated wetting agent and molecular defoamer (e.g., SURFYNOL® 420 from Evonik Degussa), non-ionic wetting agents and molecular defoamers (e.g., SURFYNOL® 104E from Evonik Degussa), and/or water-soluble, non-ionic surfactants (e.g., TERGITOL™ TMN-6, TERGITOL™ 15-S-7, or TERGITOL™ 15-S-9 (a secondary alcohol ethoxylate) from The Dow Chemical Company or TEGO® Wet 510 (organic surfactant) available from Evonik Degussa). Yet another suitable (anionic) surfactant includes alkyldiphenyloxide disulfonate (e.g., the DOWFAX™ series, such a 2A1, 3B2, 8390, C6L, C10L, and 30599, from The Dow Chemical Company).

Whether a single surfactant is used or a combination of surfactants is used, the total amount of surfactant(s) in the hydrophilic agent may range from about 0.01 wt % active to about 20 wt % active based on the total weight of the fusing agent. In an example, the total amount of surfactant(s) in the hydrophilic agent may be about 0.85 wt % active based on the total weight of the hydrophilic agent.

The aqueous liquid vehicle of the hydrophilic agent may also include antimicrobial agent(s). Suitable antimicrobial agents include biocides and fungicides. Example antimicrobial agents may include the NUOSEPT™ (Troy Corp.), UCARCIDE™ (The Dow Chemical Company), ACTICIDE® B20 (Thor Chemicals), ACTICIDE® M20 (Thor Chemicals), ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (The Dow Chemical Company), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from The Dow Chemical Company).

In an example, the hydrophilic agent may include a total amount of antimicrobial agents that ranges from about 0.0001 wt % active to about 1 wt % active. In an example, the antimicrobial agent(s) is/are a biocide(s) and is/are present in the hydrophilic agent in an amount ranging from about 0.25 wt % active to about 0.35 wt % active (based on the total weight of the hydrophilic agent).

An anti-kogation agent may be included in the hydrophilic agent that is to be jetted using thermal inkjet printing. Kogation refers to the deposit of dried printing liquid (e.g., hydrophilic agent) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS® 03A or CRODAFOS® N-3 acid from Croda), dextran 500k, CRODAFOS™ HCE (phosphate-ester from Croda Int.), CRODAFOS® N10 (oleth-10-phosphate from Croda Int.), DISPERSOGEN® LFH (polymeric dispersing agent with aromatic anchoring groups, acid form, anionic, from Clariant), or a combination of oleth-3-phosphate and a low molecular weight (e.g., <5,000) acrylic acid polymer (e.g., commercially available as CARBOSPERSE™ K-7028 Polyacrylate from Lubrizol).

Whether a single anti-kogation agent is used or a combination of anti-kogation agents is used, the total amount of anti-kogation agent(s) in the hydrophilic agent may range from greater than 0.10 wt % active to about 1.5 wt % active based on the total weight of the hydrophilic agent. In an example, the oleth-3-phosphate is included in an amount ranging from about 0.20 wt % active to about 0.60 wt % active.

Chelating agents (or sequestering agents) may be included in the aqueous liquid vehicle of the hydrophilic agent to eliminate the deleterious effects of heavy metal impurities. Examples of chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the hydrophilic agent may range from greater than 0 wt % active to about 2 wt % active based on the total weight of the hydrophilic agent. In an example, the chelating agent(s) is/are present in the hydrophilic agent in an amount of about 0.05 wt % active (based on the total weight of the hydrophilic agent).

The aqueous liquid vehicle of the hydrophilic agent may also include a buffer to prevent undesirable changes in the pH. Examples of buffers include TRIS (tris(hydroxymethyl) aminomethane or TRIZMA®), bis-tris propane, TES (2-[(2-Hydroxy-1,1-bis(hydroxymethyl)ethyl)amino]ethanesulfonic acid), MES (2-ethanesulfonic acid), MOPS (3-(N-morpholino)propanesulfonic acid), HEPES (4-(2-hydroxyethyl)-1-piperazineethanesulfonic acid), DIPSO (3-(N,N-Bis[2-hydroxyethyl]amino)-2-hydroxypropanesulfonic acid), Tricine (N-[tris(hydroxymethyl)methyl]glycine), HEPPSO (β-Hydroxy-4-

(2-hydroxyethyl)-1-piperazinepropanesulfonic acid monohydrate), POPSO (Piperazine-1,4-bis(2-hydroxypropanesulfonic acid) dihydrate), EPPS (4-(2-Hydroxyethyl)-1-piperazinepropanesulfonic acid), 4-(2-Hydroxyethyl)piperazine-1-propanesulfonic acid), TEA (triethanolamine buffer solution), Gly-Gly (Diglycine), bicine (N,N-Bis(2-hydroxyethyl)glycine), HEPBS (N-(2-Hydroxyethyl)piperazine-N'-(4-butanesulfonic acid)), TAPS ([tris(hydroxymethyl)methylamino]propanesulfonic acid), AMPD (2-amino-2-methyl-1,3-propanediol), TABS (N-tris(Hydroxymethyl)methyl-4-aminobutanesulfonic acid), or the like.

Whether a buffer is used or a combination of buffers is used, the total amount of buffer(s) in the hydrophilic agent may range from greater than 0 wt % active to about 0.5 wt % active based on the total weight of the hydrophilic agent. In an example, the buffer(s) is/are present in the hydrophilic agent in an amount of about 0.1 wt % active (based on the total weight of the hydrophilic agent).

Whether any or all of these additives are included in the hydrophilic agent, it is to be understood that the balance of the hydrophilic agent is water. As such, the amount of water may vary depending upon the amounts of the hydrophilic polymer and any other components that are included. In an example, deionized water or purified water may be used.

Fusing Agents

The fluid kit(s) and/or 3D printing kit(s) disclosed herein include one or more fusing agents.

Some examples of the fusing agent have substantial absorption (e.g., 80%) at least in the visible region (400 nm-780 nm). These examples of the fusing agent are referred to as the core fusing agent, or, in some instances, the black fusing agent. As described herein, the energy absorber (or active material) in the core fusing agent may also absorb energy in the infrared region (e.g., 800 nm to 4000 nm). This absorption generates heat suitable for coalescing/fusing the build material composition in contact therewith during 3D printing, which leads to 3D objects (or 3D objects regions) having mechanical integrity and relatively uniform mechanical properties (e.g., strength, elongation at break, etc.). This absorption, however, also results in strongly colored, e.g., black, 3D objects (or 3D objects regions).

Other examples of the fusing agent include an energy absorber having absorption at wavelengths ranging from 800 nm to 4000 nm and having transparency at wavelengths ranging from 400 nm to 780 nm. These examples of the fusing agent are referred to as the primer fusing agent, or, in some instances, the low tint fusing agent. This absorption and transparency allows the primer fusing agent to absorb enough radiation to coalesce/fuse the build material composition in contact therewith while enabling the 3D objects (or 3D objects regions) to be white or slightly colored.

Still other examples of the energy absorber absorb at least some of the wavelengths within the range of 400 nm to 4000 nm. Examples include glass fibers, titanium dioxide, clay, mica, talc, barium sulfate, calcium carbonate, phosphate pigments, and/or silicate pigments. These energy absorbers are often white or lightly colored and may be used in either the core fusing agent or the primer fusing agent.

Phosphates may have a variety of counterions, such as copper, zinc, iron, magnesium, calcium, strontium, the like, and combinations thereof. Examples of phosphates can include $M_2P_2O_7$, $MAP_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. Silicates can have the same or similar counterions as phosphates. Example silicates can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $CuzSi_2O_6$, $Cu/ZnSi_2O_6$, or other suitable combination of counterions. It is noted that the phosphates and silicates described herein are not limited to counterions having a +2 oxidation state, and that other counterions can also be used to prepare other suitable near-infrared pigments.

As used herein "absorption" means that at least 80% of radiation having wavelengths within the specified range is absorbed. Also used herein, "transparency" means that 25% or less of radiation having wavelengths within the specified range is absorbed.

Core Fusing Agent

Some examples of the core fusing agent are dispersions including an energy absorber (i.e., an active material). In some examples, the active material may be an infrared light absorbing colorant. In an example, the active material is a near-infrared light absorbing colorant. Any near-infrared colorants, e.g., those produced by Fabricolor, Eastman Kodak, or BASF, Yamamoto, may be used in the core fusing agent. As one example, the core fusing agent may be a printing liquid formulation including carbon black as the active material. Examples of this printing liquid formulation are commercially known as CM997A, 516458, C18928, C93848, C93808, or the like, all of which are available from HP Inc.

As another example, the core fusing agent may be a printing liquid formulation including near-infrared absorbing dyes as the active material. Examples of this printing liquid formulation are described in U.S. Pat. No. 9,133,344, incorporated herein by reference in its entirety. Some examples of the near-infrared absorbing dye are water-soluble near-infrared absorbing dyes selected from the group consisting of:

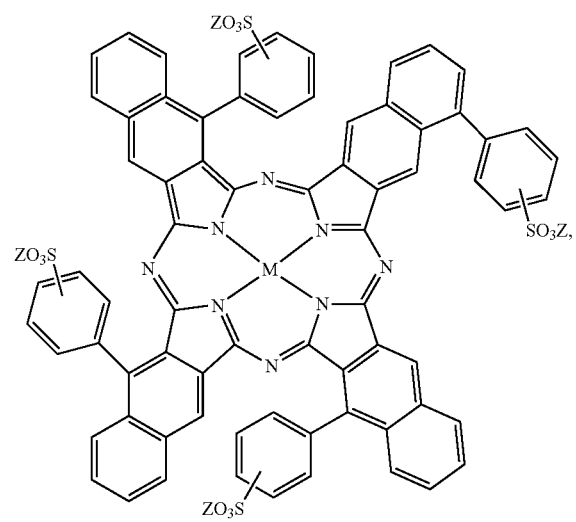

-continued

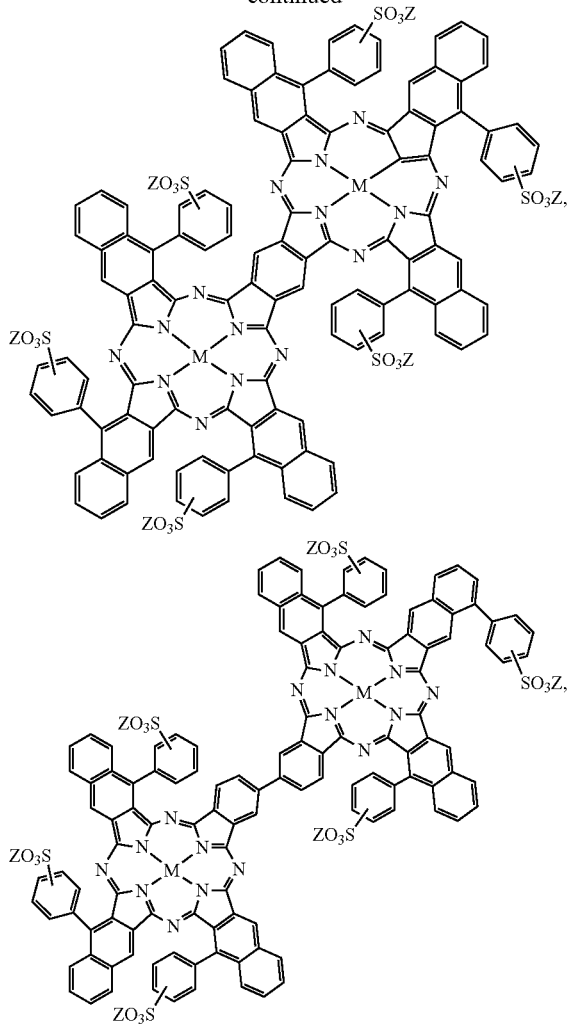

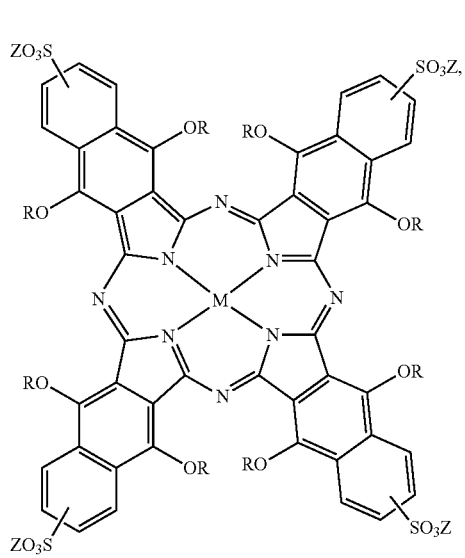

and mixtures thereof. In the above formulations, M can be a divalent metal atom (e.g., copper, etc.) or can have $OSO_3Na$ axial groups filling any unfilled valencies if the metal is more than divalent (e.g., indium, etc.), R can be hydrogen or any $C_1$-$C_8$ alkyl group (including substituted alkyl and unsubstituted alkyl), and Z can be a counterion such that the overall charge of the near-infrared absorbing dye is neutral. For example, the counterion can be sodium, lithium, potassium, $NH_4^+$, etc.

Some other examples of the near-infrared absorbing dye are hydrophobic near-infrared absorbing dyes selected from the group consisting of:

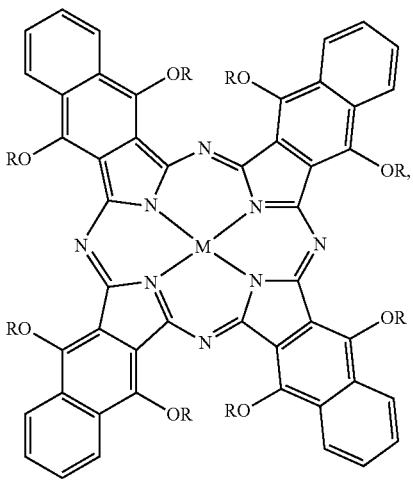

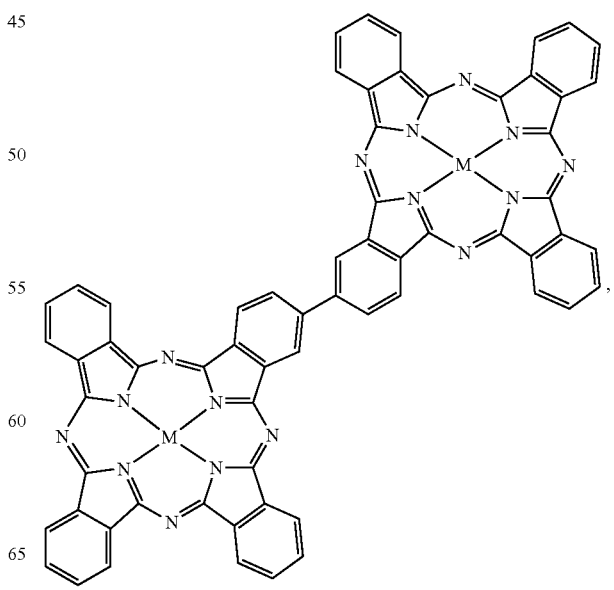

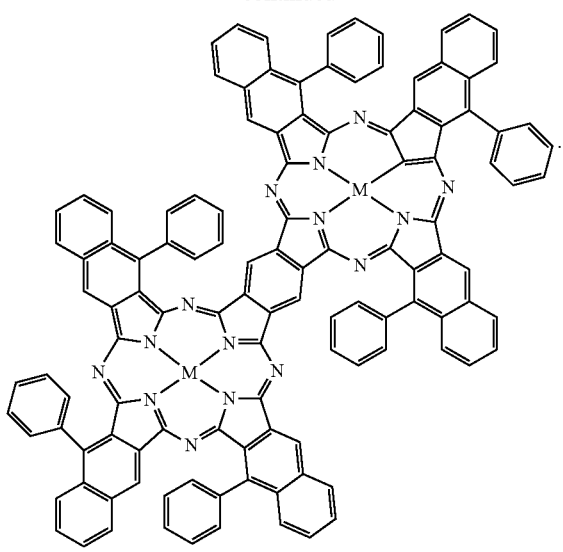

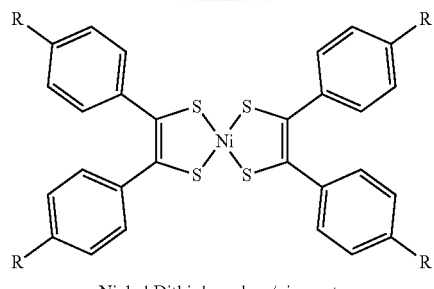

Nickel Dithiolene dyes/pigments where R in the anthraquinone dyes or pigments may be hydrogen or any $C_1$-$C_8$ alkyl group (including substituted alkyl and unsubstituted alkyl), and R in the dithiolene may be hydrogen, COOH, $SO_3$, $NH_2$, any $C_1$-$C_8$ alkyl group (including substituted alkyl and unsubstituted alkyl), or the like.

Cyanine dyes or pigments and perylenediimide dyes or pigments may have the following structures, respectively:

and mixtures thereof. For the hydrophobic near-infrared absorbing dyes, M can be a divalent metal atom (e.g., copper, etc.) or can include a metal that has Cl, Br, or OR' (R'=H, $CH_3$, $COCH_3$, $COCH_2COOCH_3$, $COCH_2COCH_3$) axial groups filling any unfilled valencies if the metal is more than divalent, and R can be hydrogen or any $C_1$-$C_8$ alkyl group (including substituted alkyl and unsubstituted alkyl).

Other near-infrared absorbing dyes or pigments may be used in the core fusing agent. Some examples include anthraquinone dyes or pigments, metal dithiolene dyes or pigments, cyanine dyes or pigments, perylenediimide dyes or pigments, croconium dyes or pigments, pyrilium or thiopyrilium dyes or pigments, boron-dipyrromethene dyes or pigments, or aza-boron-dipyrromethene dyes or pigments.

Anthraquinone dyes or pigments and metal (e.g., nickel) dithiolene dyes or pigments may have the following structures, respectively:

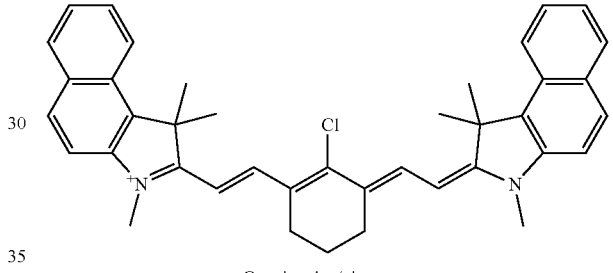

Cyanine dye/pigments

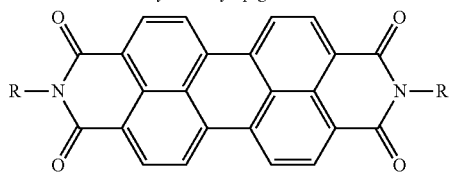

Perylenediimide dyes/pigments where R in the perylenediimide dyes or pigments may be hydrogen or any $C_1$-$C_8$ alkyl group (including substituted alkyl and unsubstituted alkyl).

Croconium dyes or pigments and pyrilium or thiopyrilium dyes or pigments may have the following structures, respectively:

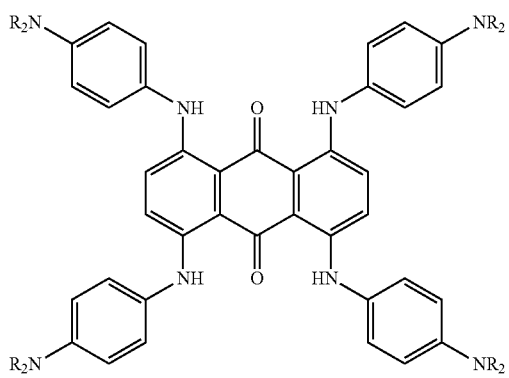

Anthraquinone dyes/pigments

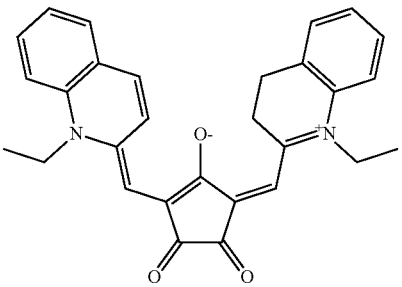

Croconium dye/pigments

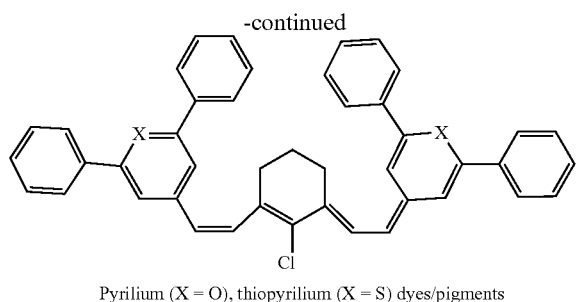

Pyrilium (X = O), thiopyrilium (X = S) dyes/pigments

Boron-dipyrromethene dyes or pigments and aza-boron-dipyrromethene dyes or pigments may have the following structures, respectively:

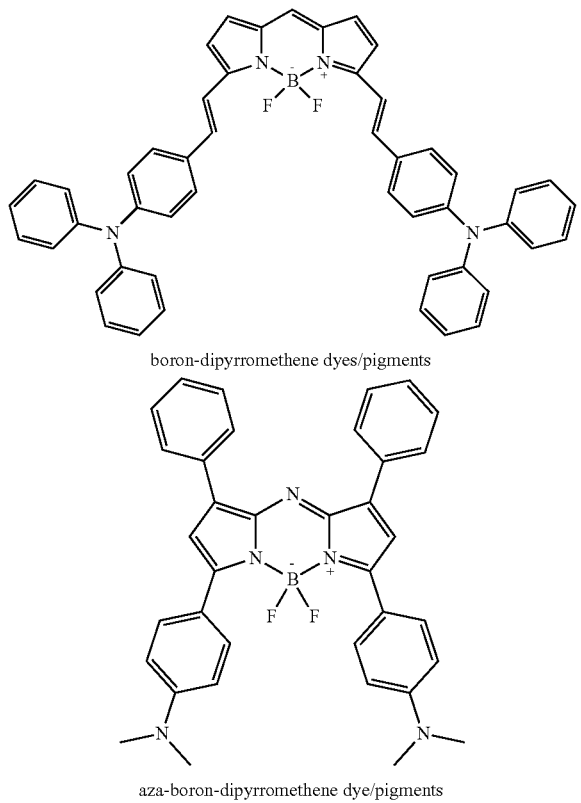

boron-dipyrromethene dyes/pigments aza-boron-dipyrromethene dye/pigments

Other suitable near-infrared absorbing dyes may include aminium dyes, tetraaryldiamine dyes, phthalocyanine dyes, and others.

Other near infrared absorbing materials include conjugated polymers (i.e., a polymer that has a backbone with alternating double and single bonds), such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof.

The amount of the energy absorber/active material that is present in the core fusing agent ranges from greater than 0 wt % active to about 40 wt % active based on the total weight of the core fusing agent. In other examples, the amount of the active material in the core fusing agent ranges from about 0.3 wt % active to 30 wt % active, from about 1 wt % active to about 20 wt % active, from about 1.0 wt % active up to about 10.0 wt % active, or from greater than 4.0 wt % active up to about 15.0 wt % active. It is believed that these active material loadings provide a balance between the core fusing agent having jetting reliability and heat and/or radiation absorbance efficiency.

Primer Fusing Agent

Some examples of the primer fusing agent are dispersions including the energy absorber that has absorption at wavelengths ranging from 800 nm to 4000 nm and transparency at wavelengths ranging from 400 nm to 780 nm. The absorption of this energy absorber is the result of plasmonic resonance effects. Electrons associated with the atoms of the energy absorber may be collectively excited by radiation, which results in collective oscillation of the electrons. The wavelengths that can excite and oscillate these electrons collectively are dependent on the number of electrons present in the energy absorber particles, which in turn is dependent on the size of the energy absorber particles. The amount of energy that can collectively oscillate the particle's electrons is low enough that very small particles (e.g., 1-100 nm) may absorb radiation with wavelengths several times (e.g., from 8 to 800 or more times) the size of the particles. The use of these particles allows the primer fusing agent to be inkjet jettable as well as electromagnetically selective (e.g., having absorption at wavelengths ranging from 800 nm to 4000 nm and transparency at wavelengths ranging from 400 nm to 780 nm).

In an example, the energy absorber of the primer fusing agent has an average particle diameter (e.g., volume-weighted mean diameter) ranging from greater than 0 nm to less than 220 nm. In another example, the energy absorber has an average particle diameter ranging from greater than 0 nm to 120 nm. In a still another example, the energy absorber has an average particle diameter ranging from about 10 nm to about 200 nm.

In an example, the energy absorber of the primer fusing agent is an inorganic pigment. Examples of suitable inorganic pigments include lanthanum hexaboride ($LaB_6$), tungsten bronzes ($A_xWO_3$), indium tin oxide ($In_2O_3:SnO_2$, ITO), antimony tin oxide ($Sb_2O_3:SnO_2$, ATO), titanium nitride (TIN), aluminum zinc oxide (AZO), ruthenium oxide ($RuO_2$), silver (Ag), gold (Au), platinum (Pt), iron pyroxenes ($A_xFe_ySi_2O_6$ wherein A is Ca or Mg, x=1.5-1.9, and y=0.1-0.5), modified iron phosphates ($A_xFe_yPO_4$), modified copper phosphates ($A_xCu_yPO_2$), and modified copper pyrophosphates ($A_xCu_yP_2O_7$). Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO$) may include copper iron phosphate (A=Cu, x=0.1-0.5, and y=0.5-0.9), magnesium iron phosphate (A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Combinations of the inorganic pigments may also be used.

The amount of the energy absorber that is present in the primer fusing agent ranges from greater than 0 wt % active to about 40 wt % active based on the total weight of the primer fusing agent. In other examples, the amount of the energy absorber in the primer fusing agent ranges from about 0.3 wt % active to 30 wt % active, from about 1 wt % active to about 20 wt % active, from about 1.0 wt % active up to about 10.0 wt % active, or from greater than 4.0 wt % active up to about 15.0 wt % active. It is believed that these energy absorber loadings provide a balance between the primer fusing agent having jetting reliability and heat and/or radiation absorbance efficiency.

The energy absorber of the primer fusing agent may, in some instances, be dispersed with a dispersant. As such, the dispersant helps to uniformly distribute the energy absorber throughout the primer fusing agent. Examples of suitable dispersants include polymer or small molecule dispersants, charged groups attached to the energy absorber surface, or other suitable dispersants. Some specific examples of suitable dispersants include a water-soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), or water-soluble styrene-maleic anhydride copolymers/resins.

Whether a single dispersant is used or a combination of dispersants is used, the total amount of dispersant(s) in the primer fusing agent may range from about 10 wt % to about 200 wt % based on the weight of the energy absorber in the primer fusing agent.

A silane coupling agent may also be added to the primer fusing agent to help bond the organic (e.g., dispersant) and inorganic (e.g., pigment) materials. Examples of suitable silane coupling agents include the SILQUEST® A series manufactured by Momentive.

Whether a single silane coupling agent is used or a combination of silane coupling agents is used, the total amount of silane coupling agent(s) in the primer fusing agent may range from about 0.1 wt % to about 50 wt % based on the weight of the energy absorber in the primer fusing agent. In an example, the total amount of silane coupling agent(s) in the primer fusing agent ranges from about 1 wt % to about 30 wt % based on the weight of the energy absorber. In another example, the total amount of silane coupling agent(s) in the primer fusing agent ranges from about 2.5 wt % to about 25 wt % based on the weight of the energy absorber.

One example of the primer fusing agent includes cesium tungsten oxide (CTO) nanoparticles as the energy absorber. The CTO nanoparticles have a formula of $Cs_xWO_3$, where $0<x<1$. The cesium tungsten oxide nanoparticles may give the primer fusing agent a light blue color. The strength of the color may depend, at least in part, on the amount of the CTO nanoparticles in the primer fusing agent. When it is desirable to form an outer white layer on the 3D object, less of the CTO nanoparticles may be used in the primer fusing agent in order to achieve the white color. In an example, the CTO nanoparticles may be present in the primer fusing agent in an amount ranging from about 1 wt % to about 20 wt % (based on the total weight of the primer fusing agent).

The average particle size (e.g., volume-weighted mean diameter) of the CTO nanoparticles may range from about 1 nm to about 40 nm. In some examples, the average particle size of the CTO nanoparticles may range from about 1 nm to about 15 nm or from about 1 nm to about 10 nm. The upper end of the particle size range (e.g., from about 30 nm to about 40 nm) may be less desirable, as these particles may be more difficult to stabilize.

This example of the primer fusing agent may also include a zwitterionic stabilizer. The zwitterionic stabilizer may improve the stabilization of this example of the primer fusing agent. While the zwitterionic stabilizer has an overall neutral charge, at least one area of the molecule has a positive charge (e.g., amino groups) and at least one other area of the molecule has a negative charge. The CTO nanoparticles may have a slight negative charge. The zwitterionic stabilizer molecules may orient around the slightly negative CTO nanoparticles with the positive area of the zwitterionic stabilizer molecules closest to the CTO nanoparticles and the negative area of the zwitterionic stabilizer molecules furthest away from the CTO nanoparticles. Then, the negative charge of the negative area of the zwitterionic stabilizer molecules may repel CTO nanoparticles from each other. The zwitterionic stabilizer molecules may form a protective layer around the CTO nanoparticles, and prevent them from coming into direct contact with each other and/or increase the distance between the particle surfaces (e.g., by a distance ranging from about 1 nm to about 2 nm). Thus, the zwitterionic stabilizer may prevent the CTO nanoparticles from agglomerating and/or settling in the primer fusing agent.

Examples of suitable zwitterionic stabilizers include $C_2$ to $C_8$ betaines, $C_2$ to $C_8$ aminocarboxylic acids having a solubility of at least 10 g in 100 g of water, taurine, and combinations thereof. Examples of the $C_2$ to $C_8$ aminocarboxylic acids include beta-alanine, gamma-aminobutyric acid, glycine, and combinations thereof.

The zwitterionic stabilizer may be present in the primer fusing agent in an amount ranging from about 2 wt % to about 35 wt % (based on the total weight of the primer fusing agent). When the zwitterionic stabilizer is the $C_2$ to $C_8$ betaine, the $C_2$ to $C_8$ betaine may be present in an amount ranging from about 8 wt % to about 35 wt % of the total weight of the primer fusing agent. When the zwitterionic stabilizer is the $C_2$ to $C_8$ aminocarboxylic acid, the $C_2$ to $C_8$ aminocarboxylic acid may be present in an amount ranging from about 2 wt % to about 20 wt % of the total weight of the primer fusing agent. When the zwitterionic stabilizer is taurine, taurine may be present in an amount ranging from about 2 wt % to about 35 wt % of the total weight of the primer fusing agent.

In this example, the weight ratio of the CTO nanoparticles to the zwitterionic stabilizer may range from 1:10 to 10:1; or the weight ratio of the CTO nanoparticles to the zwitterionic stabilizer may be 1:1.

Vehicle for Fusing Agents

Any example of the fusing agent (core or primer fusing agent) includes a liquid vehicle. The fusing agent vehicle, or "FA vehicle," may refer to the liquid in which the energy absorber is/are dispersed or dissolved to form the respective fusing agent. A wide variety of FA vehicles, including aqueous and non-aqueous vehicles, may be used in the fusing agents. In some examples, the FA vehicle may include water alone or a non-aqueous solvent alone with no other components. In other examples, the FA vehicle may include other components, depending, in part, upon the applicator that is to be used to dispense the fusing agent. Examples of other suitable fusing agent components include co-solvent(s), humectant(s), surfactant(s), antimicrobial agent(s), anti-kogation agent(s), and/or chelating agent(s).

It is to be understood that any of the include co-solvent(s), surfactant(s), antimicrobial agent(s), anti-kogation agent(s), and/or chelating agent(s) described herein for the hydrophilic agent may be used in any examples of the fusing agent in any of the amounts provided, except that the percentages will be with respect to the total weight of the fusing agent.

The FA vehicle may also include humectant(s). An example of a suitable humectant is ethoxylated glycerin having the following formula:

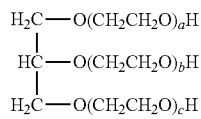

in which the total of a+b+c ranges from about 5 to about 60, or in other examples, from about 20 to about 30. An example of the ethoxylated glycerin is LIPONIC® EG-1 (LEG-1, glycereth-26, a+b+c=26, available from Lipo Chemicals).

In an example, the total amount of the humectant(s) present in the fusing agent ranges from about 3 wt % active to about 10 wt % active, based on the total weight of the fusing agent.

The balance of the fusing agent(s) is water (e.g., deionized water, purified water, etc.), which as described herein, may vary depending upon the other components in the fusing agent(s).

Detailing Agent

Some examples of the multi-fluid kit and/or 3D printing kit include a detailing agent. The detailing agent may include a surfactant, a co-solvent, and a balance of water. In some examples, the detailing agent consists of these components, and no other components. In some other examples, the detailing agent may further include a colorant. In still some other examples, detailing agent consists of a colorant, a surfactant, a co-solvent, and a balance of water, with no other components. In yet some other examples, the detailing agent may further include additional components, such as anti-kogation agent(s), antimicrobial agent(s), and/or chelating agent(s) (each of which is described above in reference to the fusing agent).

The surfactant(s) that may be used in the detailing agent include any of the surfactants listed herein in reference to the hydrophilic agent. The total amount of surfactant(s) in the detailing agent may range from about 0.10 wt % to about 5.00 wt % with respect to the total weight of the detailing agent.

The co-solvent(s) that may be used in the detailing agent include any of the co-solvents listed above in reference to the hydrophilic agent. The total amount of co-solvent(s) in the detailing agent may range from about 1.00 wt % to about 65.00 wt % with respect to the total weight of the detailing agent.

In some examples, the detailing agent does not include a colorant. In these examples, the detailing agent may be colorless. As used herein, "colorless," means that the detailing agent is achromatic and does not include a colorant.

When the detailing agent includes the colorant, the colorant may be a dye of any color having substantially no absorbance in a range of 650 nm to 2500 nm. By "substantially no absorbance" it is meant that the dye absorbs no radiation having wavelengths in a range of 650 nm to 2500 nm, or that the dye absorbs less than 10% of radiation having wavelengths in a range of 650 nm to 2500 nm. The dye may also be capable of absorbing radiation with wavelengths of 650 nm or less. As such, the dye absorbs at least some wavelengths within the visible spectrum, but absorbs little or no wavelengths within the near-infrared spectrum. This is in contrast to the active (energy absorbing) material in the fusing agent, which absorbs wavelengths within the near-infrared spectrum. As such, the colorant in the detailing agent will not substantially absorb the fusing radiation, and thus will not initiate melting and fusing (coalescence) of the build material composition in contact therewith when the build material layer is exposed to the energy.

It may be desirable to add color to the detailing agent when the detailing agent is applied to the edge of a colored part. Color in the detailing agent may be desirable when used at a part edge because some of the colorant may become embedded in the build material 24 that fuses/coalesces at the edge. As such, in some examples, the dye in the detailing agent may be selected so that its color matches the color of the active material in the fusing agent. As examples, the dye may be any azo dye having sodium or potassium counter ion(s) or any diazo (i.e., double azo) dye having sodium or potassium counter ion(s), where the color of azo or dye azo dye matches the color of the fusing agent.

In an example, the dye is a black dye. Some examples of the black dye include azo dyes having sodium or potassium counter ion(s) and diazo (i.e., double azo) dyes having sodium or potassium counter ion(s). Examples of azo and diazo dyes may include tetrasodium (6Z)-4-acetamido-5-oxo-6-[[7-sulfonato-4-(4-sulfonatophenyl)azo-1-naphthyl]hydrazono]naphthalene-1,7-disulfonate with a chemical structure of:

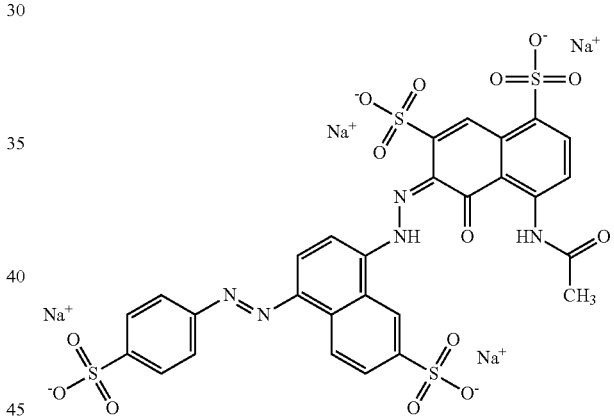

(commercially available as Food Black 1); tetrasodium 6-amino-4-hydroxy-3-[[7-sulfonato-4-[(4-sulfonatophenyl)azo]-1-naphthyl]azo]naphthalene-2,7-disulfonate with a chemical structure of:

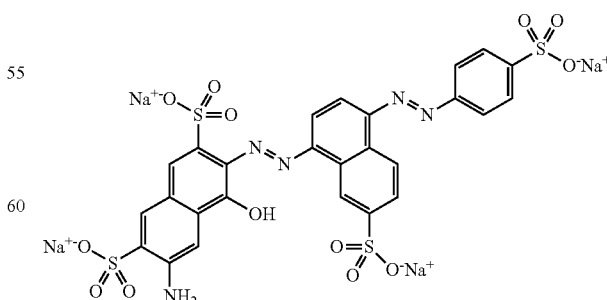

(commercially available as Food Black 2); tetrasodium (6E)-4-amino-5-oxo-3-[[4-(2-sulfonatooxyethylsulfonyl)

phenyl]diazenyl]-6-[[4-(2-sulfonatooxyethylsulfonyl)phenyl]hydrazinylidene]naphthalene-2,7-disulfonate with a chemical structure of:

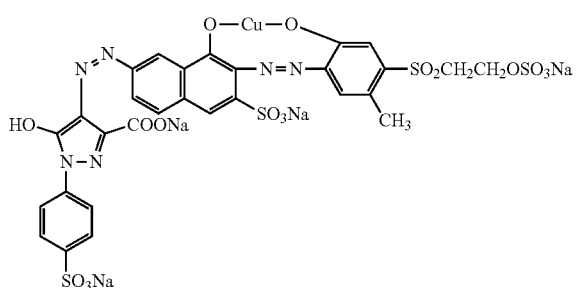

(commercially available as Reactive Black 31); tetrasodium (6E)-4-amino-5-oxo-3-[[4-(2-sulfonatooxyethylsulfonyl) phenyl]diazenyl]-6-[[4-(2-sulfonatooxyethylsulfonyl)phenyl]hydrazinylidene]naphthalene-2,7-disulfonate with a chemical structure of:

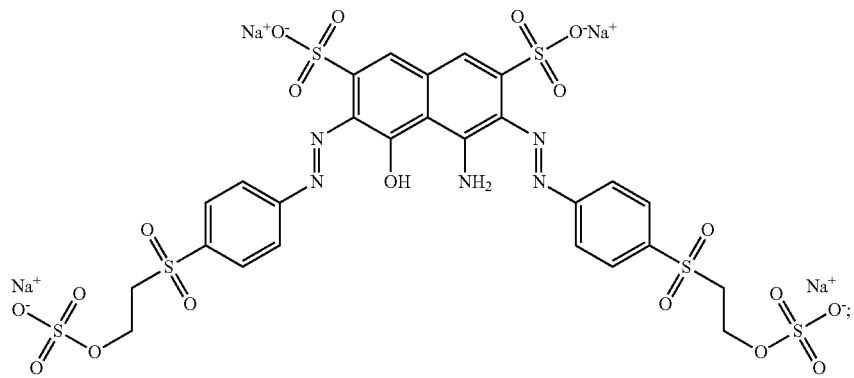

and combinations thereof. Some other commercially available examples of the dye used in the detailing agent include multipurpose black azo-dye based liquids, such as PRO-JET® Fast Black 1 (made available by Fujifilm Holdings), and black azo-dye based liquids with enhanced water fastness, such as PRO-JET® Fast Black 2 (made available by Fujifilm Holdings).

In some instances, in addition to the black dye, the colorant in the detailing agent may further include another dye. In an example, the other dye may be a cyan dye that is used in combination with any of the dyes disclosed herein. The other dye may also have substantially no absorbance above 650 nm. The other dye may be any colored dye that contributes to improving the hue and color uniformity of the final 3D part.

Some examples of the other dye include a salt, such as a sodium salt, an ammonium salt, or a potassium salt. Some specific examples include ethyl-[4-[[4-[ethyl-[(3-sulfophenyl) methyl]amino]phenyl]-(2-sulfophenyl) ethylidene]-1-cyclohexa-2,5-dienylidene]-[(3-sulfophenyl) methyl] azanium with a chemical structure of:

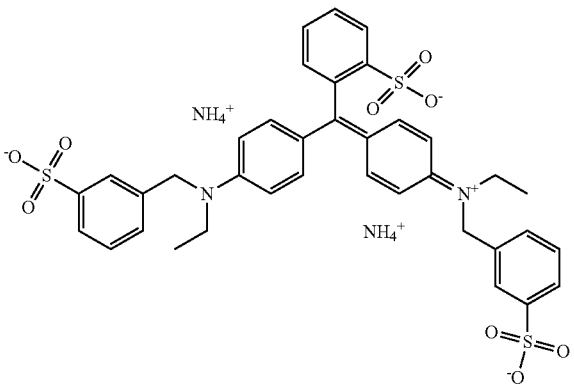

(commercially available as Acid Blue 9, where the counter ion may alternatively be sodium counter ions or potassium counter ions); sodium 4-[(E)-{4-[benzyl(ethyl)amino]phenyl}{(4E)-4-[benzyl(ethyl)iminio]cyclohexa-2,5-dien-1-ylidene}methyl]benzene-1,3-disulfonate with a chemical structure of:

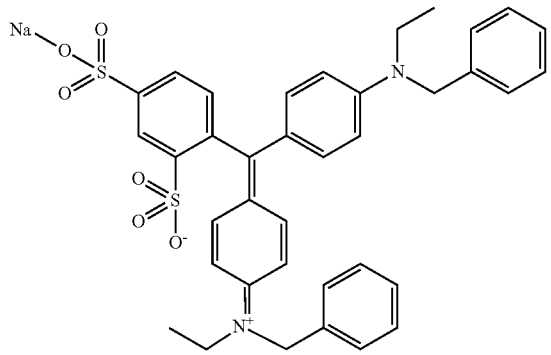

(commercially available as Acid Blue 7); and a phthalocyanine with a chemical structure of:

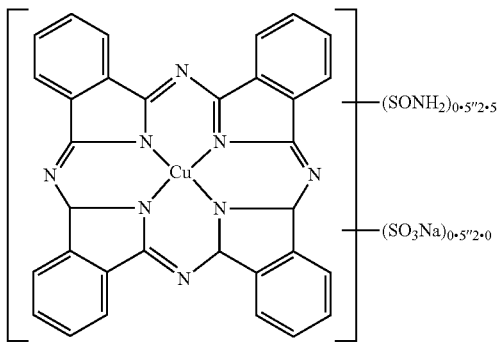

(commercially available as Direct Blue 199); and combinations thereof.

In an example of the detailing agent, the dye may be present in an amount ranging from about 1.00 wt % to about 3.00 wt % based on the total weight of the detailing agent. In another example of the detailing agent including a combination of dyes, one dye (e.g., the black dye) is present in an amount ranging from about 1.50 wt % to about 1.75 wt % based on the total weight of the detailing agent, and the other dye (e.g., the cyan dye) is present in an amount ranging from about 0.25 wt % to about 0.50 wt % based on the total weight of the detailing agent.

The balance of the detailing agent is water. As such, the amount of water may vary depending upon the amounts of the other components that are included.

Coloring Agent

Some examples of the multi-fluid kit and/or 3D printing kit include a coloring agent. The coloring agent may include a colorant, a co-solvent, and a balance of water. In some examples, the coloring agent consists of these components, and no other components. In some other examples, the coloring agent may further include a binder (e.g., an acrylic latex binder, which may be a copolymer of any two or more of styrene, acrylic acid, methacrylic acid, methyl methacrylate, ethyl methacrylate, and butyl methacrylate) and/or a buffer. In still other examples, the coloring agent may further include additional components, such as dispersant(s), humectant(s), surfactant(s), anti-kogation agent(s), antimicrobial agent(s), and/or chelating agent(s) (each of which is described herein in reference to the hydrophilic agent and/or fusing agents).

The coloring agent may be a black agent, a cyan agent, a magenta agent, or a yellow agent. As such, the colorant may be a black colorant, a cyan colorant, a magenta colorant, a yellow colorant, or a combination of colorants that together achieve a black, cyan, magenta, or yellow color.

In some instances, the colorant of the coloring agent may be transparent to infrared wavelengths. In other instances, the colorant of the coloring agent may not be completely transparent to infrared wavelengths, but does not absorb enough radiation to sufficiently heat the build material composition in contact therewith. In an example, the colorant absorbs less than 10% of radiation having wavelengths in a range of 650 nm to 2500 nm. In another example, the colorant absorbs less than 20% of radiation having wavelengths in a range of 650 nm to 4000 nm.

The colorant of the coloring agent is also capable of absorbing radiation with wavelengths of 650 nm or less. As such, the colorant absorbs at least some wavelengths within the visible spectrum, but absorbs little or no wavelengths within the near-infrared spectrum. This is in contrast to at least some examples of the energy absorber in the fusing agent, which absorbs wavelengths within the near-infrared spectrum and/or the infrared spectrum. As such, the colorant in the coloring agent will not substantially absorb the fusing radiation, and thus will not initiate coalescing/fusing of the build material composition in contact therewith when the build material composition is exposed to energy.

Examples of IR transparent colorants include acid yellow 23 (AY 23), AY17, acid red 52 (AR 52), AR 289, and reactive red 180 (RR 180). Examples of colorants that absorb some visible wavelengths and some IR wavelengths include cyan colorants, such as direct blue 199 (DB 199) and pigment blue 15:3 (PB 15:3).

In other examples, the colorant may be any azo dye having sodium or potassium counter ion(s) or any diazo (i.e., double azo) dye having sodium or potassium counter ion(s), such as those described herein for the detailing agent.

An example of the pigment based coloring agent may include from about 1 wt % to about 10 wt % of pigment(s), from about 10 wt % to about 30 wt % of co-solvent(s), from about 1 wt % to about 10 wt % of dispersant(s), from about 0.1 wt % to about 5 wt % of binder(s), from 0.01 wt % to about 1 wt % of anti-kogation agent(s), from about 0.05 wt % to about 0.1 wt % antimicrobial agent(s), and a balance of water. An example of the dye based coloring agent may include from about 1 wt % to about 7 wt % of dye(s), from about 10 wt % to about 30 wt % of co-solvent(s), from about 1 wt % to about 7 wt % of dispersant(s), from about 0.05 wt % to about 0.1 wt % antimicrobial agent(s), from 0.05 wt % to about 0.1 wt % of chelating agent(s), from about 0.005 wt % to about 0.2 wt % of buffer(s), and a balance of water.

Some examples of the coloring agent include a set of cyan, magenta, and yellow agents, such as C1893A (cyan), C1984A (magenta), and C1985A (yellow); or C4801A (cyan), C4802A (magenta), and C4803A (yellow); all of which are available from HP Inc. Other commercially available coloring agents 18 include C9384A (printhead HP 72), C9383A (printhead HP 72), C4901A (printhead HP 940), and C4900A (printhead HP 940).

Build Material Composition

The build material composition includes a polymeric build material. Examples of suitable polymeric materials include a polyamide (PAS) (e.g., PA 11/ nylon 11, PA 12/ nylon 12, PA 6/ nylon 6, PA 8/ nylon 8, PA 9/ nylon 9, PA 66/ nylon 66, PA 612/ nylon 612, PA 812/ nylon 812, PA 912/ nylon 912, etc.), a thermoplastic polyamide (TPA), a thermoplastic polyurethane (TPU), a styrenic block copolymer (TPS), a thermoplastic polyolefin elastomer (TPO), a thermoplastic vulcanizate (TPV), thermoplastic copolyester (TPC), a polyether block amide (PEBA), and a combination thereof.

In some examples, the polymeric build material may be in the form of a powder. In other examples, the polymeric build material may be in the form of a powder-like material, which includes, for example, short fibers having a length that is greater than its width. In some examples, the powder or powder-like material may be formed from, or may include, short fibers that may, for example, have been cut into short lengths from long strands or threads of material.

The polymeric build material may be made up of similarly sized particles and/or differently sized particles. In an example, the average particle size of the polymeric build material 16 ranges from about 2 µm to about 225 µm. In another example, the average particle size of the polymeric build material 16 ranges from about 10 μm to about 130 μm. The term "average particle size", as used herein, may refer to a number-weighted mean diameter or a volume-weighted mean diameter of a particle distribution.

When the polymeric build material is a polyamide, the polymer may have a wide processing window of greater than 5° C., which can be defined by the temperature range between the melting point and the re-crystallization temperature. In an example, the polymer may have a melting point ranging from about 50° C. to about 300° C. As other examples, the polymer may have a melting point ranging from about 155° C. to about 225° C., from about 155° C. to about 215° C., about 160° C. to about 200° C., from about 170° C. to about 190° C., or from about 182° C. to about 189° C. As still another example, the polymer may be a polyamide having a melting point of about 180° C.

When the polymeric build material is a thermoplastic elastomer, the thermoplastic elastomer may have a melting range within the range of from about 130° C. to about 250° C. In some examples (e.g., when the thermoplastic elastomer is a polyether block amide), the thermoplastic elastomer may have a melting range of from about 130° C. to about 175° C. In some other examples (e.g., when the thermoplastic elastomer is a thermoplastic polyurethane), the thermoplastic elastomer may have a melting range of from about 130° C. to about 180° C. or a melting range of from about 175° C. to about 210° C.

In some examples, the polymeric build material does not substantially absorb radiation having a wavelength within the range of 300 nm to 1400 nm. The phrase "does not substantially absorb" means that the absorptivity of the thermoplastic elastomer at a particular wavelength is 25% or less (e.g., 20%, 10%, 5%, etc.)

In some examples, in addition to the polymeric build material, the build material composition may include an antioxidant, a whitener, an antistatic agent, a flow aid, or a combination thereof. While several examples of these additives are provided, it is to be understood that these additives are selected to be thermally stable (i.e., will not decompose) at the 3D printing temperatures.

Antioxidant(s) may be added to the build material composition to prevent or slow molecular weight decreases of the polymeric build material and/or to prevent or slow discoloration (e.g., yellowing) of the polymeric build material by preventing or slowing oxidation of the polymeric build material. In some examples, the polymeric material may discolor upon reacting with oxygen, and this discoloration may contribute to the discoloration of the build material composition. The antioxidant may be selected to minimize discoloration. In some examples, the antioxidant may be a radical scavenger. In these examples, the antioxidant may include IRGANOX® 1098 (benzenepropanamide, N,N'-1,6-hexanediylbis(3,5-bis(1,1-dimethylethyl)-4-hydroxy)), IRGANOX® 254 (a mixture of 40% triethylene glycol bis(3-tert-butyl-4-hydroxy-5-methylphenyl), polyvinyl alcohol and deionized water), and/or other sterically hindered phenols. In other examples, the antioxidant may include a phosphite and/or an organic sulfide (e.g., a thioester). The antioxidant may be in the form of fine particles (e.g., having an average particle size of 5 μm or less) that are dry blended with the polymeric build material 16. In an example, the antioxidant may be included in the build material composition in an amount ranging from about 0.01 wt % to about 5 wt %, based on the total weight of the build material composition. In other examples, the antioxidant may be included in the build material composition in an amount ranging from about 0.01 wt % to about 2 wt % or from about 0.2 wt % to about 1 wt %, based on the total weight of the build material composition.

Whitener(s) may be added to the build material composition to improve visibility. Examples of suitable whiteners include titanium dioxide ($TiO_2$), zinc oxide (ZnO), calcium carbonate ($CaCO_3$), zirconium dioxide ($ZrO_2$), aluminum oxide ($Al_2O_3$), silicon dioxide ($SiO_2$), boron nitride (BN), and combinations thereof. In some examples, a stilbene derivative may be used as the whitener and a brightener. In these examples, the temperature(s) of the 3D printing process may be selected so that the stilbene derivative remains stable (i.e., the 3D printing temperature does not thermally decompose the stilbene derivative). In an example, any example of the whitener may be included in the build material composition in an amount ranging from greater than 0 wt % to about 10 wt %, based on the total weight of the build material composition.

Antistatic agent(s) may be added to the build material composition to suppress tribo-charging. Examples of suitable antistatic agents include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available antistatic agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the antistatic agent is added in an amount ranging from greater than 0 wt % to less than 5 wt %, based upon the total weight of the build material composition.

Flow aid(s) may be added to improve the coating flowability of the build material composition. Flow aids may be particularly beneficial when the build material composition has an average particle size less than 25 μm. The flow aid improves the flowability of the build material composition by reducing the friction, the lateral drag, and the tribocharge buildup (by increasing the particle conductivity). Examples of suitable flow aids include aluminum oxide ($Al_2O_3$), tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), and polydimethylsiloxane (E900). In an example, the flow aid is added in an amount ranging from greater than 0 wt % to less than 5 wt %, based upon the total weight of the build material composition.

Printing Methods and Methods of Use

Different examples of the 3D printing method are shown and described in reference to FIG. 1 through FIG. 6.

Prior to execution of any examples of the method, it is to be understood that a controller may access data stored in a data store pertaining to a 3D part/object that is to be printed. For example, the controller may determine the number of layers of the build material composition that are to be formed, the locations at which any of the agents is/are to be deposited on each of the respective layers, etc.

Printing with the Hydrophilic Agent and one Fusing Agent

Figure 2:
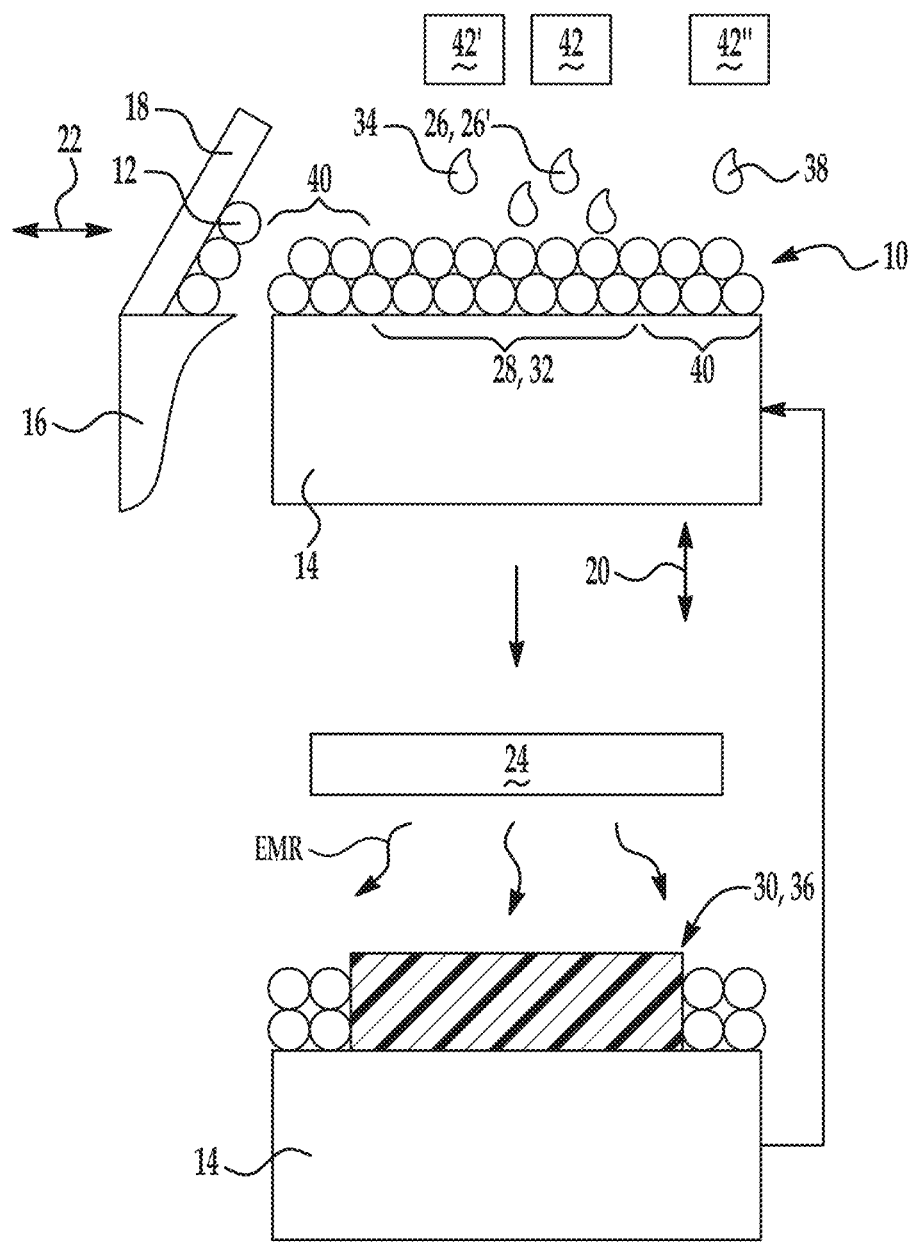
FIG. 2 is a schematic illustration of one example of the 3D printing method of FIG. 1.

Referring now to FIG. 1 and FIG. 2, an example of the method 100 which utilizes the hydrophilic agent and one of the fusing agents is depicted.

The method 100 shown in FIG. 1 includes applying a polymeric build material to form a build material layer (reference numeral 102); based on a 3D object model, selectively applying a fusing agent onto the build material layer, thereby forming a patterned portion (reference numeral 104); based on the 3D object model, selectively applying a hydrophilic agent onto at least a portion of the patterned portion, wherein the hydrophilic agent includes from 1 wt % to 12 wt % of a hydrophilic polymer dissolved in an aqueous liquid vehicle, wherein the hydrophilic polymer has a molar mass ranging from 1000 g/mol to 12,000 g/mol and is water-absorbent at a water to hydrophilic polymer weight ratio from 2:1 to 1000:1 (reference numeral 106); and exposing the build material layer to energy to selectively coalesce the patterned portion and form a 3D object layer having a hydrophilic portion (reference numeral 108).

The method 100 is shown schematically in FIG. 2. In FIG. 2, a layer 10 of the build material composition 12 is applied on a build area platform 14. A printing system may be used to apply the build material composition 12. The printing system may include the build area platform 14, a build material supply 16 containing the build material composition 12, and a build material distributor 18.

The build area platform 14 receives the build material composition 12 from the build material supply 16. The build area platform 14 may be moved in the directions as denoted by the arrow 20, e.g., along the z-axis, so that the build material composition 12 may be delivered to the build area platform 14 or to a previously formed layer. In an example, when the build material composition 12 is to be delivered, the build area platform 14 may be programmed to advance (e.g., downward) enough so that the build material distributor 18 can push the build material composition 12 onto the build area platform 14 to form a substantially uniform layer 10 of the build material composition 12 thereon. The build area platform 14 may also be returned to its original position, for example, when a new part is to be built.

The build material supply 16 may be a container, bed, or other surface that is to position the build material composition 12 between the build material distributor 18 and the build area platform 14. The build material supply 16 may include heaters so that the build material composition 12 is heated to a supply temperature ranging from about 25° C. to about 150° C. In these examples, the supply temperature may depend, in part, on the build material composition 12 used and/or the 3D printer used. As such, the range provided is one example, and higher or lower temperatures may be used.

The build material distributor 18 may be moved in the directions as denoted by the arrow 22, e.g., along the y-axis, over the build material supply 16 and across the build area platform 14 to spread the layer 10 of the build material composition 12 over the build area platform 14. The build material distributor 18 may also be returned to a position adjacent to the build material supply 16 following the spreading of the build material composition 12. The build material distributor 18 may be a blade (e.g., a doctor blade), a roller, a combination of a roller and a blade, and/or any other device capable of spreading the build material composition 12 over the build area platform 14. For instance, the build material distributor 18 may be a counter-rotating roller. In some examples, the build material supply 16 or a portion of the build material supply 16 may translate along with the build material distributor 18 such that build material composition 12 is delivered continuously to the build area platform 14 rather than being supplied from a single location at the side of the printing system as depicted in FIG. 2.

The build material supply 16 may supply the build material composition 12 into a position so that it is ready to be spread onto the build area platform 14. The build material distributor 18 may spread the supplied build material composition 12 onto the build area platform 14. The controller (not shown) may process "control build material supply" data, and in response, control the build material supply 16 to appropriately position the particles of the build material composition 12, and may process "control spreader" data, and in response, control the build material distributor 18 to spread the build material composition 12 over the build area platform 14 to form the layer 10 of the build material composition 12 thereon. In FIG. 2, one build material layer 10 has been formed.

The layer 10 has a substantially uniform thickness across the build area platform 14. In an example, the build material layer 10 has a thickness ranging from about 50 µm to about 120 µm. In another example, the thickness of the build material layer 26 ranges from about 30 µm to about 300 µm. It is to be understood that thinner or thicker layers may also be used. For example, the thickness of the build material layer 10 may range from about 20 µm to about 500 µm. The layer thickness may be about 2× (i.e., 2 times) the average diameter of the build material composition particles at a minimum for finer part definition. In some examples, the layer thickness may be about 1.2× the average diameter of the build material composition particles.

After the build material composition 12 has been applied, and prior to further processing, the build material layer 10 may be exposed to heating. In an example, the heating temperature may be below the melting point or melting range of the polymeric material of the build material composition 12. As examples, the pre-heating temperature may range from about 5° C. to about 50° C. below the melting point or the lowest temperature of the melting range of the polymeric material. In an example, the pre-heating temperature ranges from about 50° C. to about 205° C. In still another example, the pre-heating temperature ranges from about 100° C. to about 190° C. It is to be understood that the pre-heating temperature may depend, in part, on the build material composition 12 used. As such, the ranges provided are some examples, and higher or lower temperatures may be used.

Pre-heating the layer 10 may be accomplished by using any suitable heat source that exposes all of the build material composition 12 in the layer 10 to the heat. Examples of the heat source include a thermal heat source (e.g., a heater (not shown) integrated into the build area platform 14 (which may include sidewalls)) or a radiation source 24.

After the layer 10 is formed, and in some instances is pre-heated, the fusing agent(s) 26 or 26' is selectively applied on at least some of the build material composition 12 in the layer 10 to form a patterned portion 28.

To form a layer 30 of a 3D object, at least a portion (e.g., patterned portion 28) of the layer 10 of the build material composition 12 is patterned with the fusing agent 26, 26'. Either fusing agent 26 or 26' may be used. When it is desirable to form a white, colored, or slightly tinted object layer 30, the primer fusing agent 26' may be used to pattern the build material composition 12. The primer fusing agent 26' is clear or slightly tinted, and thus the resulting 3D object layer 30 may appear white or the color of the build material composition 12. When it is desirable to form a darker color or black object layer 30, the core fusing agent 26 may be used. The core fusing agent 26 is dark or black, and thus the resulting 3D object layer 30 may appear grey, black or another dark color. In other examples of the method (e.g., method 200 shown in FIG. 3 and FIG. 4) the two fusing agents 26, 26' may be used to pattern different portions of a single build material layer 10, which will be described further in reference to FIG. 3 and FIG. 4. Color may also be added by using the coloring agent (not shown), which will also be described further in reference to FIG. 7.

The volume of the fusing agent 26, 26' that is applied per unit of the build material composition 12 in the patterned portion 28 may be sufficient to absorb and convert enough electromagnetic radiation so that the build material composition 12 in the patterned portion 28 will coalesce/fuse. The volume of the fusing agent 26, 26' that is applied per unit of the build material composition 12 may depend, at least in part, on the energy absorber used, the energy absorber loading in the fusing agent 26, 26', and the build material composition 12 used.

To increase the hydrophilicity of at least a portion of the layer 30 of the 3D object, corresponding portion(s) 32 of the patterned portion 28 is/are also patterned with the hydrophilic agent 34. The hydrophilic agent 34 may be applied in accordance with 3D object model wherever it is desirable for the final 3D object layer 30 to exhibit hydrophilicity. Utilizing a hydrophilic agent 34 that is separate from the fusing agent 26, 26' enables 3D objects with tailored hydrophilic areas to be formed. In the example shown in FIG. 2, the 3D object layer 30 is an outermost layer, and thus forms one surface of the 3D object. The hydrophilic agent 34 is applied to impart hydrophilicity to this surface of the 3D object.

The volume of the hydrophilic agent 34 that is applied per unit of the build material composition 12 in the portion 32 may depend upon whether it is desirable to impart hydrophilicity at the voxel surface and/or through the voxel volume, upon the desired hydrophilicity of the resulting portion(s) 36 of the 3D object layer 30, and the volume of the fusing agent 26, 26' that is applied.

The hydrophilic agent 34 can provide a cooling effect, and thus the ratio of hydrophilic agent 34 to fusing agent 26 or 26' is controlled in order to achieve both fusing and a desired level of hydrophilicity. In an example, a weight ratio of the hydrophilic polymer in the selectively applied hydrophilic agent 34 to an energy absorber in the selectively applied fusing agent 26, 26' ranges from about 0.1 to about 5. In another example, the weight of the hydrophilic polymer applied to the portion 32 ranges from about 1.5 times to about 2.25 times more than the weight of the energy absorber applied to the portion 32.

In the example shown in FIG. 2, the detailing agent 38 is also selectively applied to the portion(s) 40 of the layer 10. The portion(s) 40 are not patterned with the fusing agent 26, 26' and thus are not to become part of the final 3D object layer 30. Thermal energy generated during radiation exposure may propagate into the surrounding portion(s) 40 that do not have the fusing agent 26, 26' applied thereto. The propagation of thermal energy may be inhibited, and thus the coalescence of the non-patterned build material portion(s) 40 may be prevented, when the detailing agent 38 is applied to these portion(s) 44.

After the agents 26 or 26', 34, and 38 are selectively applied in the specific portion(s) 28, 32, and 40 of the layer 10, the entire layer 10 of the build material composition 12 is exposed to electromagnetic radiation (shown as EMR in FIG. 2).

The electromagnetic radiation is emitted from the radiation source 24. The length of time the electromagnetic radiation is applied for, or energy exposure time, may be dependent, for example, on one or more of: characteristics of the radiation source 24; characteristics of the build material composition 12; and/or characteristics of the fusing agent 26, 26'.

It is to be understood that the electromagnetic radiation exposure may be accomplished in a single radiation event or in multiple radiation events. In an example, the exposing of the build material composition 12 is accomplished in multiple radiation events. In a specific example, the number of radiation events ranges from 3 to 8. In still another specific example, the exposure of the build material composition 12 to electromagnetic radiation may be accomplished in 3 radiation events. It may be desirable to expose the build material composition 12 to electromagnetic radiation in multiple radiation events to counteract a cooling effect that may be brought on by the amount of the agents 26 or 26', 34, 38 that is applied to the build material layer 10. Additionally, it may be desirable to expose the build material composition 12 to electromagnetic radiation in multiple radiation events to sufficiently elevate the temperature of the build material composition 12 in the portion(s) 28, 32, without over heating the build material composition 12 in the non-patterned portion(s) 40.

The fusing agent 26 or 26' enhances the absorption of the radiation, converts the absorbed radiation to thermal energy, and promotes the transfer of the thermal heat to the build material composition 12 in contact therewith. In an example, the fusing agent 26, 26' sufficiently elevates the temperature of the build material composition 12 in the portion 28 to a temperature above the melting point or within the melting range of the polymeric material, allowing coalescing/fusing (e.g., thermal merging, melting, binding, etc.) of the build material composition 12 to take place. The application of the electromagnetic radiation forms the 3D object layer 30, which, in some examples, includes a hydrophilic portion 36.

In some examples, the electromagnetic radiation has a wavelength ranging from 800 nm to 4000 nm, or from 800 nm to 1400 nm, or from 800 nm to 1200 nm. Radiation having wavelengths within the provided ranges may be absorbed (e.g., 80% or more of the applied radiation is absorbed) by the fusing agent 26, 26' and may heat the build material composition 12 in contact therewith, and may not be substantially absorbed (e.g., 25% or less of the applied radiation is absorbed) by the non-patterned build material composition 12 in portion(s) 40.

In the example shown in FIG. 2, the 3D object layer 30 has a portion 36 with hydrophilicity (which corresponds with the portion 32 patterned with both the fusing agent 26, 26' and the hydrophilic agent 34).

After the 3D object layer 30 is formed, additional layer(s) may be formed thereon to create an example of the 3D object. To form the next layer, additional build material composition 12 may be applied on the layer 30. The fusing agent 26 or 26' is then selectively applied on at least a portion of the additional build material composition 12, according to the 3D object model. The hydrophilic agent 34 may also be applied, for example, if increased hydrophilicity is desired in the next layer. The detailing agent 38 may be applied in any area of the additional build material composition 12 where coalescence is not desirable. After the agent(s) 26 or 26', 34, 38 is/are applied, the entire layer of the additional build material composition 12 is exposed to electromagnetic radiation in the manner described herein. The application of additional build material composition 12, the selective application of the agent(s) 26 or 26', 34, 38, and the electromagnetic radiation exposure may be repeated a predetermined number of cycles to form the final 3D object 30 in accordance with the 3D object model.

Some examples of the method 100 include repeating the applying of the polymeric build material 12, the selectively applying of the fusing agent 26 or 26', the selectively applying of the hydrophilic agent 34, and the exposing, to form a predetermined number of 3D object layers and a 3D printed object, wherein the hydrophilic portion 36 extends around an exterior of the 3D printed object. In these examples, the hydrophilic agent 34 may be applied on build material that is at or adjacent to object edges, according to the 3D object model.

In some examples of the method 100, it may be desirable to form a predetermined number of 3D object layers (e.g., adjacent to one another) that have respective hydrophilic portions 36. In this example, the method 100 includes iteratively applying the polymeric build material composition 12 to form individual build material layers 10; selectively applying the fusing agent 26 or 26' on the individual build material layers 10 to form individual patterned portions 28; selectively applying the hydrophilic agent 34 onto at least a portion 32 of the individual patterned portions 28; and exposing the individual build material layers 10 to energy.

Printing with the Hydrophilic Agent and Both Fusing Agents

Figure 3:
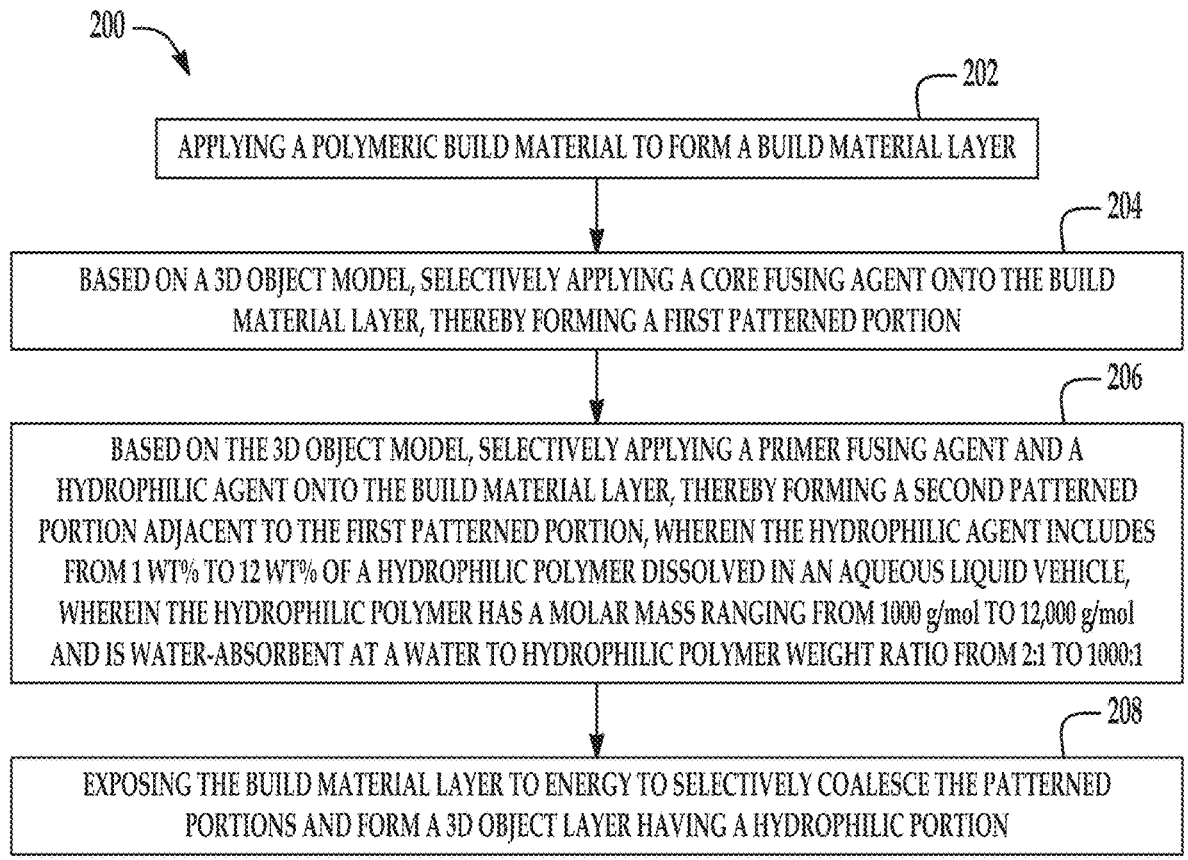
FIG. 3 is a flow diagram depicting another example of a 3D printing method.

Referring now to FIG. 3, an example of the method 200 which utilizes the hydrophilic agent 34 and both of the fusing agents 26 and 26' is depicted.

The method 200 shown in FIG. 3 includes applying a polymeric build material to form a build material layer (reference numeral 202); based on a 3D object model, selectively applying a core fusing agent onto the build material layer, thereby forming a first patterned portion (reference numeral 204); based on the 3D object model, selectively applying a primer fusing agent and a hydrophilic agent onto the build material layer, thereby forming a second patterned portion adjacent to the first patterned portion, wherein the hydrophilic agent includes from 1 wt % to 12 wt % of a hydrophilic polymer dissolved in an aqueous liquid vehicle, wherein the hydrophilic polymer has a molar mass ranging from 1000 g/mol to 12,000 g/mol and is water-absorbent at a water to hydrophilic polymer weight ratio from 2:1 to 1000:1 (reference numeral 206); and exposing the build material layer to energy to selectively coalesce the patterned portions and form a 3D object layer having a hydrophilic portion (reference numeral 208).

Figure 4:
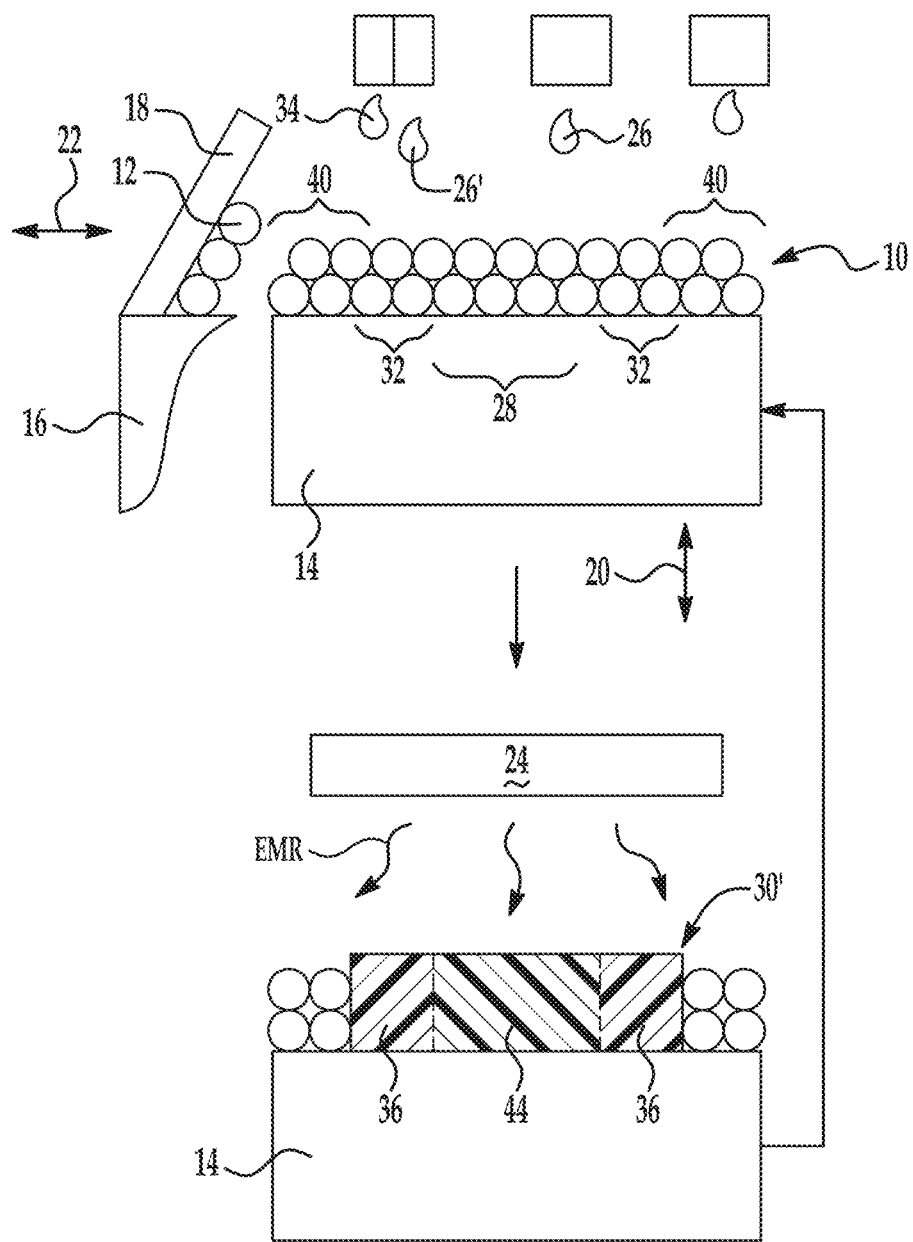
FIG. 4 is a schematic illustration of one example of the 3D printing method of FIG. 3.

The method 200 is shown schematically in FIG. 4. In FIG. 4, one layer 10 of the build material composition 12 is applied on the build area platform 14 as described in reference to FIG. 2. After the build material composition 12 has been applied, and prior to further processing, the build material layer 10 may be exposed to pre-heating as described in reference to FIG. 2.

In this example of the method 200, the core fusing agent(s) 26 is selectively applied on at least some of the build material composition 12 in the layer 10 to form a first patterned portion 28; and the primer fusing agent(s) 26' and the hydrophilic agent 34 are selectively applied on at least some of the build material composition 12 in the layer 10 to form second patterned portion(s) 32 that are adjacent to the first patterned portion 28. The first patterned portion 28 is generally located at an interior portion of the build material layer 10 and the second patterned portion 32 is generally located at an exterior portion of the build material layer 10 where it is desirable to impart hydrophilicity at one or more surface(s) of the 3D printed object layer 30'.

The volume of the core fusing agent 26 that is applied per unit of the build material composition 12 in the first patterned portion 28 may be sufficient to absorb and convert enough electromagnetic radiation so that the build material composition 12 in the patterned portion 28 will coalesce/fuse.

The volume of the primer fusing agent 26' that is applied per unit of the build material composition 12 in the second patterned portion 32 may be sufficient to absorb and convert enough electromagnetic radiation so that the build material composition 12 in the second patterned portion 32 will coalesce/fuse.

The volume of the hydrophilic agent 34 that is applied per unit of the build material composition 12 in the second patterned portion 32 may depend upon whether it is desirable to impart hydrophilicity at the voxel surface and/or through the voxel volume, upon the desired hydrophilicity of the resulting portion(s) 36 of the 3D object layer 30, and the volume of the primer fusing agent 26' that is applied. The weight ratio of the hydrophilic polymer to the energy absorber may be controlled in order to achieve both coalescence and hydrophilicity.

In the example shown in FIG. 4, the detailing agent 38 is also selectively applied to the portion(s) 40 of the layer 10. The portion(s) 40 are not patterned with the fusing agent 26, 26' and thus are not to become part of the final 3D object layer 30'.

After the agents 26, 26', 34, and 38 are selectively applied in the specific portion(s) 28, 32, and 40 of the layer 10, the entire layer 10 of the build material composition 12 is exposed to electromagnetic radiation (shown as EMR in FIG. 4). Radiation exposure may be accomplished as described in reference to FIG. 2.

In this example, the respective fusing agents 26 and 26' enhance the absorption of the radiation, convert the absorbed radiation to thermal energy, and promote the transfer of the thermal heat to the build material composition 12 in contact therewith. In an example, the fusing agents 26, 26' sufficiently elevate the temperature of the build material composition 12 in the respective portions 28, 32 to a temperature above the melting point or within the melting range of the polymeric material, allowing coalescing/fusing (e.g., thermal merging, melting, binding, etc.) of the build material composition 12 to take place. The application of the electromagnetic radiation forms the 3D object layer 30', which, in this example, includes a core portion 44 (without added hydrophilicity) and hydrophilic portions 36 at opposed ends of the core portion 44.

FIG. 4 illustrates one example of how the core fusing agent 26, the primer fusing agent 26' and the hydrophilic agent 34 may be used together to pattern a single build material layer 10.

When both fusing agents 26 and 26' are used to build up a 3D object, it may be desirable to utilize the core fusing agent 26 to form the core (e.g., the center or inner-most portion) of the 3D object, and it may be desirable to utilize the primer fusing agent 26' to form the outermost layers of the 3D object. The core fusing agent 26 can impart strength to the core of the 3D object, while the primer fusing agent 26' enables white or a color to be exhibited at the exterior of the 3D object. It is to be understood that the hydrophilic agent 34 may also be used to impart the desirable hydrophilicity to one or more surface portions 36 of the 3D object.

In some examples, it may be desirable to form a predetermined number of 3D object layers (e.g., adjacent to one another) that have respective hydrophilic portions 36. In some of these examples, the 3D object layer(s) may be outer layer(s) of the 3D printed object, and the fusing agent used to pattern these outer layer(s) is the primer fusing agent 26'. In these examples, prior to forming the outer layer(s), the method may further include forming a core of the 3D printed object by iteratively applying the polymeric build material 12 to form respective build material layers 10; selectively applying a core fusing agent 26 on the respective build material layers 10 to form respective patterned portions 28; and exposing the respective build material layers to energy.

Figure 5:
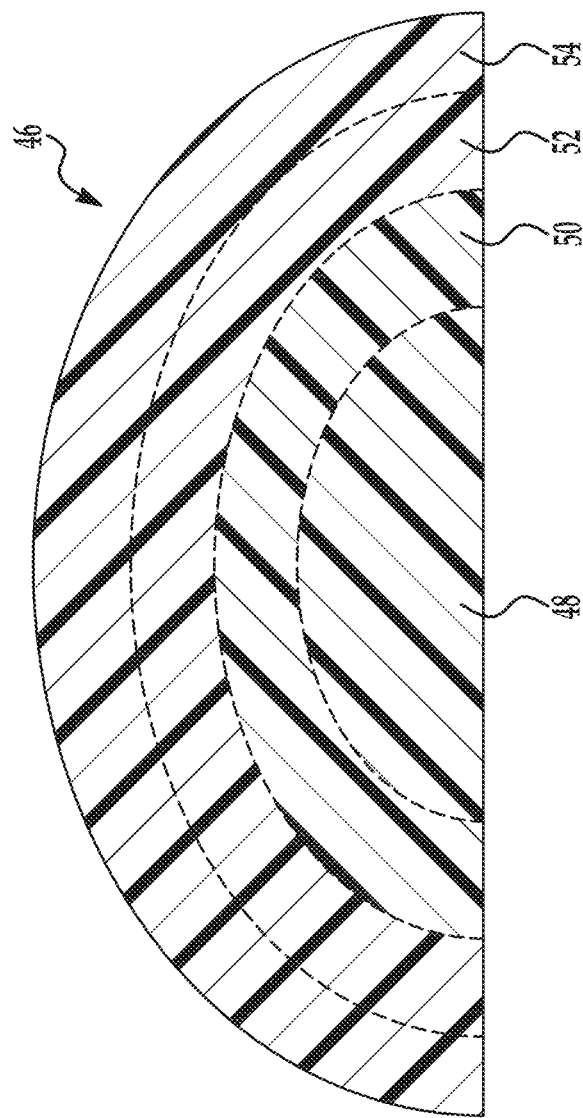
FIG. 5 is a cross-sectional view of an example 3D object.

An example of a 3D object 46 formed with the primer fusing agent 26' and the hydrophilic agent 34 and the core fusing agent 24 is shown in FIG. 5. To form this example of the 3D object 46, the core fusing agent 26 would be applied on multiple layers of the build material composition 12 to pattern and ultimately form the inner portions 48 and 50 of the 3D printed object 46, and the primer fusing agent 26' and the hydrophilic agent 34 would be applied on multiple layers of the build material composition 12 to pattern and ultimately form the outermost portions 52 and 54 of the 3D printed object 46. After each build material layer 10 is patterned with the agent(s) 26 and/or 26' and 34, electromagnetic radiation may be applied to solidify the respective patterned build material layers.

Figure 6:
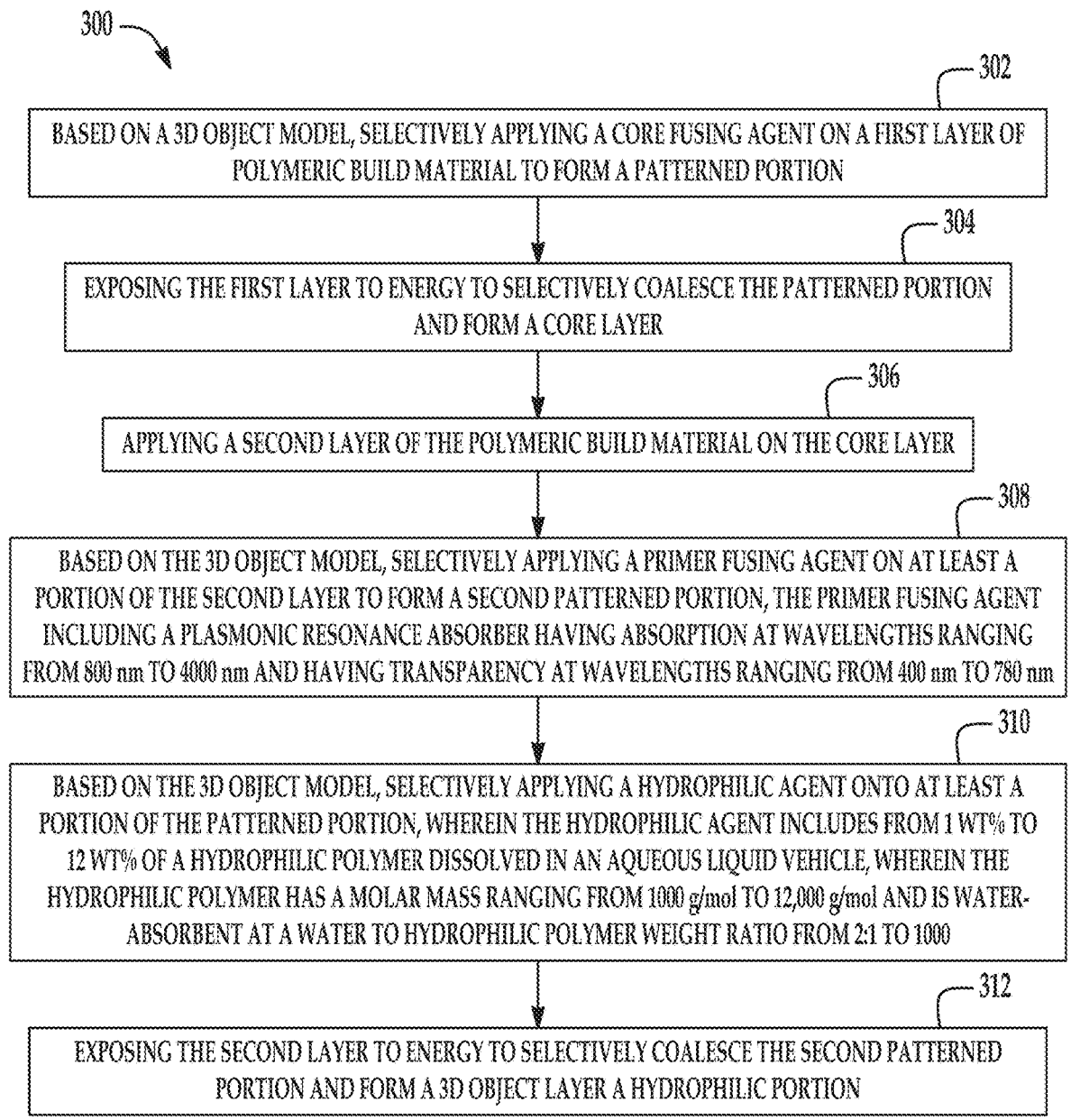
FIG. 6 is a flow diagram depicting another example of a 3D printing method.
Figure 7:
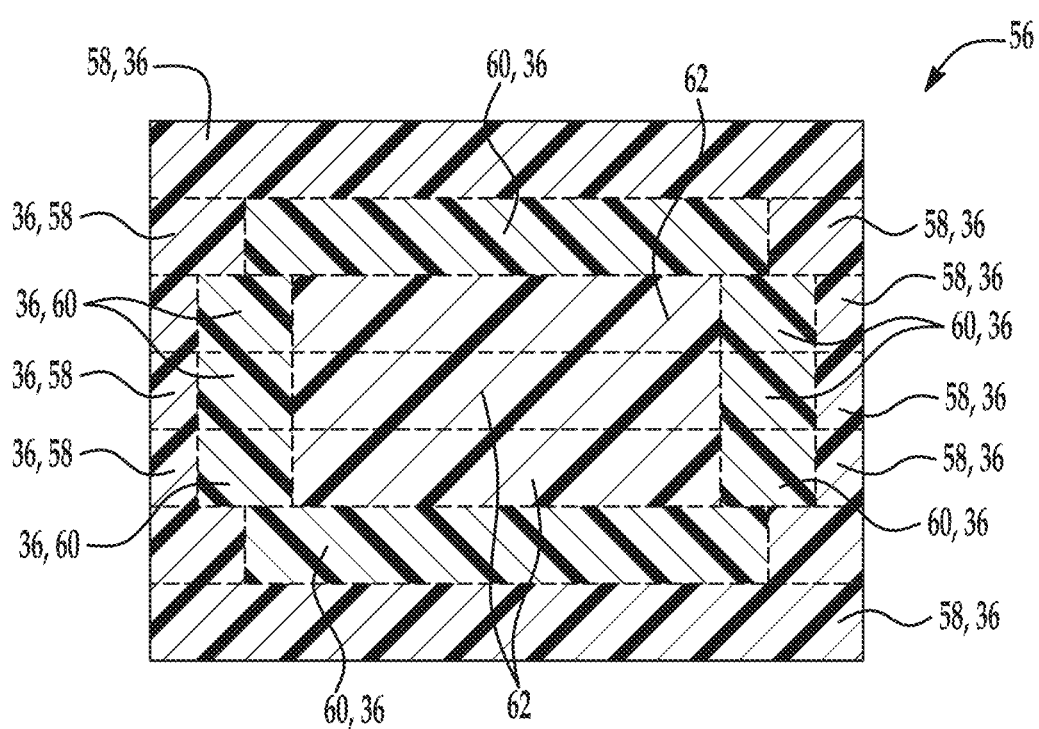
FIG. 7 is a cross-sectional view of another example 3D object.

Another example of the method 300 using each of these agents 26, 26', 34 is shown in FIG. 6, and an example of the resulting 3D object 56 is shown in FIG. 7.

The method 300 includes based on a 3D object model, selectively applying a core fusing agent on a first layer of polymeric build material to form a patterned portion 28 (reference numeral 302); exposing the first layer to energy to selectively coalesce the patterned portion and form a core layer (reference numeral 304); applying a second layer of the polymeric build material on the core layer (reference numeral 306); based on the 3D object model, selectively applying a primer fusing agent on at least a portion of the second layer to form a second patterned portion, the primer fusing agent including a plasmonic resonance absorber having absorption at wavelengths ranging from 800 nm to 4000 nm and having transparency at wavelengths ranging from 400 nm to 780 nm (reference numeral 308); based on the 3D object model, selectively applying a hydrophilic agent on at least a portion of the second patterned portion, wherein the hydrophilic agent includes from 1 wt % to 12 wt % of a hydrophilic polymer dissolved in an aqueous liquid vehicle, wherein the hydrophilic polymer has a molar mass ranging from 1000 g/mol to 12,000 g/mol and is water-absorbent at a water to hydrophilic polymer weight ratio from 2:1 to 1000:1 (reference numeral 310); and exposing the second layer to energy to selectively coalesce the second patterned portion and form a 3D object layer (in this example, a primer layer) having a hydrophilic portion (reference numeral 312). Some examples of the method 300 further includes selectively applying the primer fusing agent 26' and the hydrophilic agent 34 on the first layer at an area adjacent to the patterned portion, whereby the area coalesces to form a hydrophilic edge portion adjacent to the core layer.

An example of the 3D object 56 formed using the method 300 is shown in FIG. 7. To form this example of the 3D object 56, the outermost build material layer(s) and the outermost edges of the middle build material layers would be patterned with the primer fusing agent 26' and the hydrophilic agent 34 to form 3D object layers 58, 60, each of which has the hydrophilic portion 36. This example illustrates the hydrophilic portion 36 at the entire exterior of the 3D object 56, but it is to be understood that the hydrophilic agent 34 may be selectively applied so that portions of the exterior are hydrophilic, while other portions of the exterior are not hydrophilic. In the example shown in FIG. 7, the innermost portions of the middle build material layers would be patterned with the core fusing agent 26 to form the core portions 62 of the object 56.

In this example of the method 300, any number of core layers 62 (without hydrophilic portions) may be formed, and any number of 3D object layers 58, 60 (with hydrophilic portions 36) may be formed.

In one example of the method 300, a predetermined number of 3D object layers without hydrophilic portions (i.e., core layers 62) are formed by iteratively applying the polymeric build material 12 to form respective build material layers 10; selectively applying the core fusing agent 26 on the respective build material layers 10 to form respective patterned portions 28; and exposing the respective build material layers to energy. In some examples, the predetermined number of 3D object layers without hydrophilic portions (i.e., core layers 62) is formed on top of a predetermined number of 3D object layers 58, 60 having respective hydrophilic portions 36. In these examples, the method 300 may also include forming a second predetermined number of 3D object layers 58, 60 having respective hydrophilic portions 26 on the predetermined number of 3D object layers without hydrophilic portions (i.e., core layers 62) by iteratively applying the polymeric build material 12 to form additional individual build material layers 10; selectively applying the primer fusing agent 26' on the additional individual build material layers 10 to form additional individual patterned portions 32; selectively applying the hydrophilic agent 34 onto at least a portion of the additional individual patterned portions 32; and exposing the additional individual build material layers to energy.

In the example shown in FIG. 7, the coloring agent may also be applied with the primer fusing agent 26' to generate color at the exterior surfaces of the object 56. For example, the coloring agent may be applied with the primer fusing agent 26' and the hydrophilic agent 34 on the build material that forms the 3D object layers 58. Since the primer fusing agent 26' is clear or slightly tinted and the build material composition 12 is white or off-white, the color of the coloring agent will be the color of the resulting 3D object layers 58. The colorant of the coloring agent becomes embedded throughout the coalesced/fused build material composition of the 3D object layers 58. In this example, the 3D object layers 60 (which white or slightly tinted) may or may not have the coloring agent applied thereto. These intermediate layers 60 may help to form a mask over the black (or dark colored) core layers 62 because they optically isolate the core layers 62.

While several variations of the objects 46, 56 and the combinations of fusing agents 26, 26' have been described, it is to be understood that the fusing agents 26, 26' may be used to form any desirable 3D object.

In any of the examples of the method 100, 200, 300 disclosed herein, any of the agents (fusing agent 26, 26', hydrophilic agent 34, detailing agent 38 and/or coloring agent) may be dispensed from an applicator 42, 42', 42" (shown in FIG. 2 and FIG. 4). The applicator(s) 42, 42', 42" may each be a thermal inkjet printhead, a piezoelectric printhead, a continuous inkjet printhead, etc., and the selective application of the fusing agent 26, 26', hydrophilic agent 34, detailing agent 38 and/or coloring agent may be accomplished by thermal inkjet printing, piezo electric inkjet printing, continuous inkjet printing, etc. The controller may process data, and in response, control the applicator(s) 42, 42', 42" to deposit the fusing agent 26, 26', hydrophilic agent 34, detailing agent 38 and/or coloring agent onto predetermined portion(s) of the build material composition 12. It is to be understood that the applicators 42, 42', 42" may be separate applicators or a single applicator with several individual cartridges for dispensing the respective agents.

It is to be understood that the selective application of any of the fusing agent 26, 26', hydrophilic agent 34, detailing agent 38 and/or coloring agent may be accomplished in a single printing pass or in multiple printing passes. In some examples, the agent(s) is/are selectively applied in a single printing pass. In some other examples, the agent(s) is/are selectively applied in multiple printing passes. In one of these examples, the number of printing passes ranging from 2 to 4. In still other examples, 2 or 4 printing passes are used. It may be desirable to apply the fusing agent 26, 26', hydrophilic agent 34, detailing agent 38 and/or coloring agent in multiple printing passes to increase the amount, e.g., of the energy absorber, hydrophilic polymer, colorant, etc. that is applied to the build material composition 12, to avoid liquid splashing, to avoid displacement of the build material composition 12, etc.

Any of the examples of the method 100, 200, 300 disclosed herein may also include a post-printing process which exposes the 3D printed object to the hydrophilic agent 34. In these examples, the 3D printed object may be removed the build area platform 14 and excess (non-coalesced) build material composition 12 may be removed from the 3D object. The 3D object may then be dipped into a solution of the hydrophilic agent 34. This process may add additional hydrophilic agent 34 to the entire surface of the 3D printed object.

To further illustrate the present disclosure, an example is given herein. It is to be understood that this example is provided for illustrative purposes and is not to be construed as limiting the scope of the present disclosure.

EXAMPLE

Two examples of the hydrophilic agent (HA1 and HA2) were prepared with a polyelectrolyte, and one control agent was prepared without the polyelectrolyte. The formulations are shown in Table 1. The weight percentages in Table 1 represent the active amount unless noted otherwise with the phrase "as is".

TABLE 1

| Category | Ingredient | HA 1* (wt %) | HA 2 (wt %) | Control (wt %) |
| --- | --- | --- | --- | --- |
| Organic Co-solvent | 2-Pyrrolidone | 4 | 4 | 4 |
| Hydrophilic Polymer | Poly(acrylic acid sodium salt) | 7.5 | 10 | — |
| Surfactant | Tergitol ® 15-S-9 or 15-S-12 | 0.85 | 0.85 | 0.85 |
| Anti-kogation Agent | Crodafos ® O3A | 0.5 | 0.5 | 0.5 |
| Chelator | Trilon ® M (as is) | 0.05 | 0.05 | 0.05 |
| Biocide | Acticide ® B20 (as is) | 0.18 | 0.18 | 0.18 |
|  | Acticide ® M20 (as is) | 0.14 | 0.14 | 0.14 |
| Buffer | Trizma ® or TRIS ® | 0.1 | 0.1 | 0.1 |
| Solvent | Water | Balance | Balance | Balance |

*a couple drops of cyan dye were added to enhance visualization of the printed data HA1 was printed with a thermal inkjet printer to determine the printability and decap performance of the hydrophilic agent. The cyan dye was included in HA1 to enhance the visibility of the print. The hydrophilic agent HA1 exhibited acceptable printing performance.

HA2 and the control agent were used in a 3D printing process. The build material was polyamide-12 and the fusing agent formulation is shown in Table 2. The weight percentages in Table 2 represent the active amount unless noted otherwise with the phrase "as is".

TABLE 2

| Category | Ingredient | FA (wt %) |
| --- | --- | --- |
| Energy Absorber | CTO dispersion | 8 |
| Organic Co-Solvent | 2-pyrollidone | 19 |
| Surfactant | Tergitol ® 15-S-9 | 0.75 |
| Anti-kogation Agent | Crodafos ® O3A | 0.5 |
| Chelator | Trilon ® M (as is) | 0.0064 |
| Biocide | Acticide ® B20 | 0.036 |
| Stabilizers | Betaine (from CTO dispersion) | 8 |
|  | Beta-alanine | 3 |
| Solvent | Water | Balance |

A layer of the polyamide-12 build material was spread on a build area platform and then was patterned with the fusing agent and exposed to electromagnetic radiation. Additional layers (totaling 100) were printed in a similar manner to form cubes. One comparative cube (CC1) was printed without any hydrophilic agent and without any control agent. A second comparative cube (CC2) was printed with the fusing agent and the control agent in the outermost layers (e.g., 3-5 layers) on each side of the cube. An example cube (EC) was printed with the fusing agent and HA2 in the outermost layers (e.g., 3-5 layers) on each side of the cube. The weight ratios of HA2: fusing agent for the example cube EC and of the control agent:fusing agent for the second comparative cube CC2 were the same, and the weight ratio of the hydrophilic polymer:energy absorber was in accordance with the examples disclosed herein (e.g., 1:1-5:1).

Figure 8A:
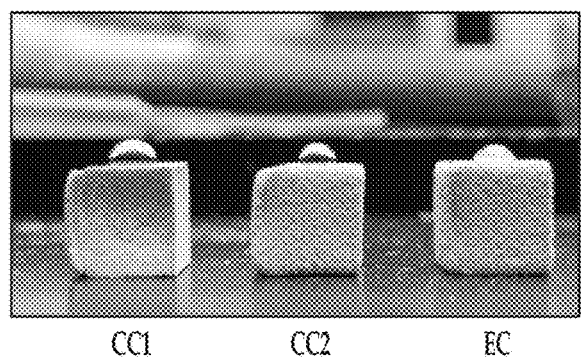
FIGS. 8A and 8B are black and white reproductions of originally colored photographs depicting example and comparative example 3D printed objects at different times during a tap water droplet test.
Figure 8B:
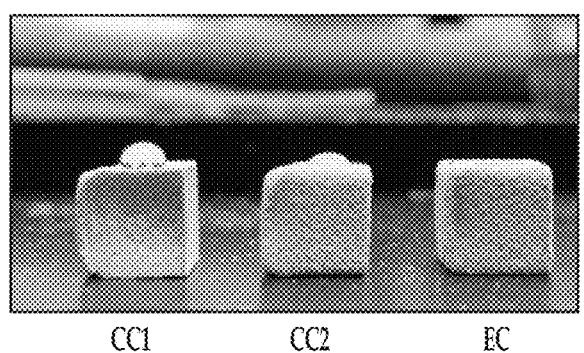

A drop of tap water was deposited on each of the cubes to perform a qualitative contact angle measurement test. Pictures of the cubes were taken at T=0 (when the water droplets were deposited), and at T=4 (4 minutes after the water droplets were deposited). The T=0 picture is reproduced as FIG. 8A and the T=4 picture is reproduced as FIG. 8B. The first comparative cube (CC1, no HA and no control agent) is on the left, the second comparative cube (CC2, control agent in outer layers) is in the middle, and the example cube (EC, HA2 in the outer layers) in on the right. From the moment the water droplet was dispensed, the contact angle was the lowest for the example cube EC. Complete wetting behavior (contact angle $<<90°$) was observed for the example cube EC at T=4, indicating that surface hydrophilicity was successfully altered via deposition of HA2. This behavior was observed for different sides of the example cube EC, suggesting sufficient coverage of HA2 around the entire part surface area. In contrast, the second comparative cube (CC2, with the control agent in outer layers) absorbed some of the water after 4 minutes, and the first comparative cube (CC1, with no HA or control agent) absorbed almost none of the tap water after 4 minutes.

Figure 9A:
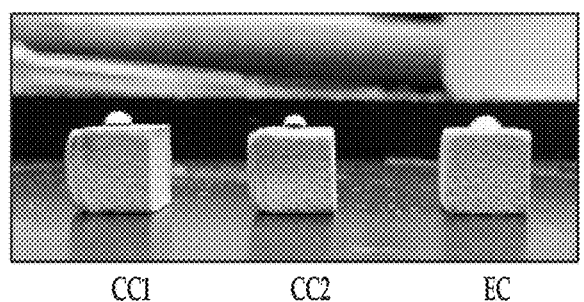
FIGS. 9A through 9C are black and white reproductions of originally colored photographs depicting example and comparative example 3D printed objects at different times during a deionized water droplet test.
Figure 9B:
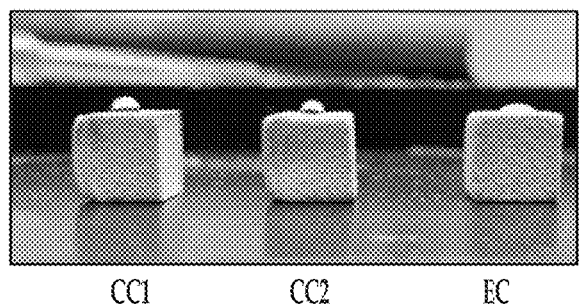
Figure 9C:
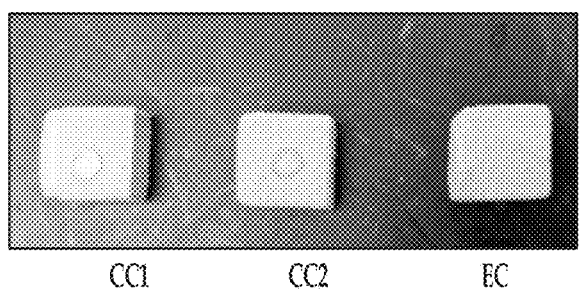

The test was repeated using deionized water to confirm reproducible behavior irrespective of the ionic strength of the water. Pictures of the cubes were taken at T=0 (when the water droplets were deposited), and at T=2 (2 minutes after the water droplets were deposited). At T=4 (4 minutes after the water droplets were deposited), a picture of the top of the cubes was taken. The T=0 picture is reproduced as FIG. 9A, the T=2 picture is reproduced as FIG. 9B, and the T=4 picture is reproduced as FIG. 9C. The first comparative cube (CC1, no HA and no control agent) is on the left, the second comparative cube (CC2, control agent in outer layers) is in the middle, and the example cube (EC, HA2 in the outer layers) in on the right. Nearly identical wetting behavior was observed for the cubes with deionized water. The top view visually confirmed the substantial differences in wetting behavior between the comparative and example cubes.

These experiments indicate that a relatively hydrophobic polymer can exhibit efficient wetting characteristics using the hydrophilic agent disclosed herein.

It is to be understood that the ranges provided herein include the stated range and any value or sub-range within the stated range, as if such values or sub-ranges were explicitly recited. For example, from about 1 wt % to about 12 wt % should be interpreted to include not only the explicitly recited limits of from about 1 wt % to about 12 wt %, but also to include individual values, such as about 1.5 wt %, about 4 wt %, about 7.75 wt %, about 11 wt %, etc., and sub-ranges, such as from about 1.25 wt % to about 10 wt %, from about 3.2 wt % to about 5.2 wt %, from about 3 wt % to about 8 wt %, etc.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein. As an example, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A method of modifying surface hydrophilicity of a three-dimensional (3D) printed object, comprising:
    based on a 3D object model, selectively applying a core fusing agent on a first layer of polymeric build material to form a patterned portion;
    exposing the first layer to energy to selectively coalesce the patterned portion and form a core layer;
    applying a second layer of the polymeric build material on the core layer;
    based on the 3D object model, selectively applying a primer fusing agent on at least a portion of the second layer to form a second patterned portion, the primer fusing agent including a plasmonic resonance absorber having absorption at wavelengths ranging from 800 nm to 4000 nm and having transparency at wavelengths ranging from 400 nm to 780 nm;
    based on the 3D object model, selectively applying a hydrophilic agent on at least a portion of the second patterned portion, wherein the hydrophilic agent includes from 1 wt % to 12 wt % of a hydrophilic polymer dissolved in an aqueous liquid vehicle, wherein the hydrophilic polymer has a molar mass ranging from 1000 g/mol to 12,000 g/mol and is water-absorbent at a water to hydrophilic polymer weight ratio from 2:1 to 1000:1; and
    exposing the second layer to energy to selectively coalesce the second patterned portion and form a 3D object layer having a hydrophilic portion.

2. The method as defined in claim 1, further comprising selectively applying the primer fusing agent and the hydrophilic agent on the first layer at an area adjacent to the patterned portion, whereby the area coalesces to form a hydrophilic edge portion adjacent to the core layer.

3. The method as defined in claim 1, further comprising forming a predetermined number of core layers by:
    iteratively applying the polymeric build material to form respective build material layers;
    selectively applying the core fusing agent on the respective build material layers to form respective patterned portions; and
    exposing the respective build material layers to energy.

4. The method as defined in claim 3, further comprising selectively applying the primer fusing agent and the hydrophilic agent on each of the respective build material layers at respective areas adjacent to the respective patterned portions, whereby the respective areas coalesce to form respective hydrophilic edge portions adjacent to each of the core layers.

5. The method as defined in claim 1, further comprising selectively applying a detailing agent.

6. The method as defined in claim 1 wherein the hydrophilic polymer is selected from the group consisting of poly (acrylic acid) sodium salt, poly (vinyl alcohol), poly (acrylamide), and poly (hydroxy ethyl acrylate).

7. The method as defined in claim 1 wherein the hydrophilic polymer is poly (acrylic acid) sodium salt and is present in the hydrophilic agent in an amount ranging from about 2 wt % to about 10 wt %.

8. The method as defined in claim 1 wherein the hydrophilic polymer has a molar mass ranging from about 1,500 g/mol to about 5,000 g/mol.

9. The method as defined in claim 1 wherein the aqueous liquid vehicle of the hydrophilic agent consists of water.

10. The method as defined in claim 1 wherein the aqueous liquid vehicle of the hydrophilic agent includes water and at least one of an organic co-solvent, a surfactant, an anti-kogation agent, a chelator, a biocide, and a buffer.

11. The method as defined in claim 5 wherein the detailing agent includes a surfactant, a co-solvent, and water.

12. The method as defined in claim 11 wherein the detailing agent further includes a colorant.

13. The method as defined in claim 1, further comprising selectively applying a coloring agent, wherein the coloring agent includes a colorant, a co-solvent, and water.

14. The method as defined in claim 1 wherein the selectively applying of the hydrophilic agent includes jetting the hydrophilic agent on the at least the portion of the second patterned portion of the polymeric build material.

15. The method as defined in claim 1 wherein prior to selectively applying the core fusing agent on the first layer of the polymeric build material, the method further comprises pre-heating the first layer of the polymeric build material.

16. The method as defined in claim 1 wherein the hydrophilic polymer has a molar mass ranging from about 5,000 g/mol to about 12,000 g/mol.

17. The method as defined in claim 1 wherein the exposing of the first layer includes exposing the first layer to electromagnetic energy having a wavelength ranging from 800 nm to 4000 nm to selectively heat and coalesce the patterned portion and form the core layer.

18. The method as defined in claim 1 wherein the exposing of the second layer includes exposing the second layer to electromagnetic energy having a wavelength ranging from 800 nm to 4000 nm to selectively heat and coalesce the second patterned portion and form the 3D object layer having the hydrophilic portion.

* * * * *